US012276146B2

(12) United States Patent
Prison et al.

(10) Patent No.: US 12,276,146 B2
(45) Date of Patent: Apr. 15, 2025

(54) PROFILE RAIL FOR A DOOR GUIDE

(71) Applicant: Edscha Engineering GmbH, Remscheid (DE)

(72) Inventors: Stefan Prison, Remscheid (DE); Thorsten Weiss, Remscheid (DE)

(73) Assignee: Edscha Engineering GmbH, Remscheid (DE)

( * ) Notice: Subject to any disclaimer, the term of this patent is extended or adjusted under 35 U.S.C. 154(b) by 0 days.

(21) Appl. No.: 18/143,055

(22) Filed: May 3, 2023

(65) Prior Publication Data

US 2023/0272652 A1 Aug. 31, 2023

Related U.S. Application Data

(63) Continuation-in-part of application No. PCT/DE2022/100815, filed on Nov. 4, 2022.

(30) Foreign Application Priority Data

Nov. 5, 2021 (DE) ..................... 10 2021 128 914.9
Mar. 6, 2023 (DE) ..................... 20 2023 101 053.9

(51) Int. Cl.
*E05D 15/00* (2006.01)
*E05D 15/10* (2006.01)

(52) U.S. Cl.
CPC .. *E05D 15/1047* (2013.01); *E05D 2015/1055* (2013.01); *E05Y 2201/684* (2013.01); (Continued)

(58) Field of Classification Search
CPC ............ E05D 15/0621; E05D 15/0604; E05D 15/0608; E05D 15/10; E05D 15/1042; (Continued)

(56) References Cited

U.S. PATENT DOCUMENTS 3,155,149 A * 11/1964 Ford ...................... A47H 1/104 160/346
4,021,129 A * 5/1977 Sykes ..................... F16B 12/32 403/255

(Continued)

FOREIGN PATENT DOCUMENTS

CN 108661476 B 11/2019
DE 102008021802 A1 11/2009

(Continued)

OTHER PUBLICATIONS

Search Report for PCT/DE2022/100815.

*Primary Examiner* — Chuck Y Mah
(74) *Attorney, Agent, or Firm* — Davidson Kappel LLC

(57) ABSTRACT

A profile rail for a door guide of a vehicle, comprises a first profile rail piece with a first end face and with a second end face, and a connecting piece. The connecting piece comprises a first end and a second end. The first end of the connecting piece comprises a first end-face connection region for connecting to the first profile rail piece. The connecting piece is designed as a separate profile rail piece. The connecting piece can be connected via the first end-face connection region to at least one end face of the first profile rail piece by means of a plug-in system. The first end-face connection region is arranged in a first connection plane which has a first angle to a first plane normal to an extension of the connecting piece.

20 Claims, 14 Drawing Sheets

(52) U.S. Cl.
CPC ..... *E05Y 2600/51* (2013.01); *E05Y 2600/528* (2013.01); *E05Y 2600/61* (2013.01); *E05Y 2600/62* (2013.01)

(58) Field of Classification Search
CPC ... E05D 15/1047; E05D 15/26; E05D 15/266; E05D 2015/1005; E05D 2015/1055; E05F 1/16; E05F 3/06; E05F 3/18; E05F 5/003; E05Y 2201/212; E05Y 2201/412; E05Y 2201/684; E05Y 2600/51; E05Y 2600/314; E05Y 2600/528; E05Y 2600/61; E05Y 2600/62; E05Y 2900/20; E05Y 2900/212; E06B 3/4762
See application file for complete search history.

(56) References Cited

U.S. PATENT DOCUMENTS

| | | | | | |
|---|---|---|---|---|---|
| 4,152,872 | A * | 5/1979 | Tanizaki | E05D 15/063 | 16/98 |
| 6,647,590 | B2 * | 11/2003 | Haab | F16B 7/187 | 16/94 R |
| 6,779,832 | B2 | 8/2004 | Assumcao | | |
| 9,730,556 | B2 * | 8/2017 | Wei | E06B 3/9636 | |
| 2003/0110716 | A1 * | 6/2003 | Hansen | E04F 11/1808 | 256/65.01 |
| 2003/0145502 | A1 * | 8/2003 | Roy | A47G 1/10 | 40/782 |
| 2008/0310911 | A1 * | 12/2008 | Jones | F16B 7/042 | 403/309 |
| 2014/0062124 | A1 * | 3/2014 | Accossato | E05D 15/0652 | 29/592 |
| 2016/0076293 | A1 * | 3/2016 | Halfon | E05D 15/0652 | 16/90 |
| 2017/0211306 | A1 | 7/2017 | Soguteu et al. | | |
| 2017/0368919 | A1 * | 12/2017 | Guempel | B60J 5/0469 | |
| 2018/0345766 | A1 | 12/2018 | Urano et al. | | |
| 2020/0048946 | A1 * | 2/2020 | Blum | A47B 61/00 | |
| 2020/0256109 | A1 * | 8/2020 | Bean | E05F 15/41 | |
| 2020/0318409 | A1 * | 10/2020 | Tschanz | E05B 65/087 | |

FOREIGN PATENT DOCUMENTS

| | | | | |
|---|---|---|---|---|
| DE | 202010010125 | U1 | 9/2010 | |
| DE | 102009033136 | A1 | 2/2011 | |
| DE | 102012101216 | A1 * | 8/2013 | E05D 15/0652 |
| EP | 1013865 | A2 * | 6/2000 | E04C 3/06 |
| GB | 1046950 | A * | 10/1966 | |
| WO | WO-2018091897 | A1 * | 5/2018 | E05D 15/0652 |

* cited by examiner

PROFILE RAIL FOR A DOOR GUIDE

The present disclosure relates to a profile rail for a door guide of a vehicle.

BACKGROUND

In practice, door guides for vehicles that are equipped with sliding doors for the entry and exit of persons are known. These sliding doors are often guided with suitable guiding or holding devices, which are fastened to the vehicle body, in a one-piece guide rail. In particular, a curved curvature portion of a one-piece profile rail or guide rail represents problems for guide means, such as rollers of a roller carriage of a door, since regions of the curvature portion can constrict or bend open with regard to the production, e.g., during the stretch-bending of the profile rail, so that work until now had to be carried out with very high manufacturing tolerances in order to ensure somewhat smooth running of the guide means, in particular in the curvature portion of the profile rail.

US 2018 0345766 A1 discloses a profile rail for a door guide of a vehicle, comprising a first profile rail piece with a first end face and with a second end face, and a connecting piece, wherein the connecting piece has a first end and a second end, wherein the first end of the connecting piece has a first end-face connection region for connecting to the first profile rail piece, wherein the connecting piece is designed as a separate profile rail piece, and wherein the connecting piece can be connected via the first end-face connection region to at least one end face of the first profile rail piece by means of a plug-in system.

CN 108661476 B discloses a profile rail for a door guide of a vehicle, comprising a first profile rail piece with a first end face and with a second end face as well as a connecting piece, wherein the connecting piece has a first end and a second end. Here, the first end of the connecting piece has a first end-face connection region for butt-to-butt arrangement with the first end face of the first profile rail piece, wherein the profile rail piece and the connecting piece comprises elongated holes so that the profile rail piece and the connecting piece can be fastened to a surface via a screw connection. Alternatively, the profile rail piece and the connecting piece are welded to one another.

DE 10 2008 021 802 A1 discloses a door guide of a vehicle with a profile rail which is divided into two parts along its longitudinal extension and comprises a lower and an upper guide rail, wherein the lower and the upper guide rail are connected to one another by riveting. The upper guide rail of the profile rail is, on the one hand, a deep-drawn component, and the lower guide rail of the profile rail is, on the other hand, a rolled and stretch-bent component. Means for guiding and supporting a vehicle door can be inserted into the profile rail and displaced along the profile rail. It is disadvantageous that the above profile rail consists of at least two components to be connected, namely an upper guide rail and a lower guide rail. Ultimately, the assembled profile rail corresponds to a one-piece component since it is divided in two parts along its longitudinal direction. In particular curved profile rails that correspond to a design of the above profile rail can have high dimensions with respect to the upper and the lower guide rail, inter alia due to the different manufacturing methods. Furthermore, thermal expansions and/or thermal contractions caused by temperature changes can also result in undesired dimensions occurring with regard to the profile rail to be assembled. As a result, it is difficult in terms of manufacturing technology to maintain particular manufacturing tolerances, whereby a reproducible final assembly of the profile rail on a vehicle is made significantly more difficult since the profile rail is assembled with the body and with further components in subsequent assembly steps. In addition, there is a risk that installation tolerances required between the guide means and the profile rail cannot be maintained so that during opening and/or closing of a sliding door, uneven running of the door and disruptive noise can occur.

DE 20 2010 010 125 U1 discloses a connection for at least two profile rail pieces. The connection comprises a first profile rail piece, a second profile rail piece and a connecting piece produced from plastic. In order to ensure a force-fitting and form-fitting connection of the two profile rail pieces, the connecting piece is glued to the first profile rail piece and to the second profile rail piece. Here, the first profile rail piece and the second profile rail piece are arranged in such a way that a first end-face end region of the first profile rail piece and a second end-face end region of the second profile rail piece abut against one another. Moreover, on an underside, the connecting piece has an adhesive coating, which is additionally equipped with a peel-off film. For a connection of the two profile rail pieces, the connecting piece is arranged both adhesively on a first surface of the first profile rail piece and adhesively on a second surface of the second profile rail piece.

U.S. Pat. No. 2,017,021 13 06 A1 discloses a one-piece profile rail for a door guide of a vehicle, comprising a first profile rail piece with a first end face and with a second end face as well as a connecting piece, wherein the connecting piece has a first end and a second end. Here, the connecting piece is designed as an intermediate element in order to set a particular distance between a vehicle body and the profile rail piece. Here, the connecting piece is arranged between the vehicle body and the profile rail piece. Furthermore, the connecting piece is oriented substantially in parallel with respect to the profile rail piece.

DE 10 2009 033 136 A1 discloses a profile rail, wherein the profile rail comprises plastic components, wherein the plastic components are produced from an irradiation-cross-linked plastic material.

SUMMARY

It is an object of the present disclosure to create a profile rail for a door guide of a vehicle, which is installation-friendly and reliable, as well as providing low-noise operation.

According to one aspect of the present disclosure, a profile rail for a door guide of a vehicle is created. The profile rail comprises a first profile rail piece with a first end face and with a second end face. Furthermore, the profile rail comprises a connecting piece which has a first end and a second end. In this case, the first end of the connecting piece has a first end-face connection region for connecting to the first profile rail piece. The profile rail is characterized in that the connecting piece is designed as a separate profile rail piece, and in that the connecting piece can be connected via the first end-face connection region to at least one end face of the first profile rail piece by means of a plug-in system. An advantage with respect to a profile rail that has multiple profile rail pieces connected to one another is the standardized modular design so that an exactly defined component is used for each particular portion of the profile rail. This always ensures high quality due to the compliance with manufacturing and installation tolerances, wherein increased flexibility during assembly is present at the same time. For this purpose, the profile rail according to the present disclosure can advantageously comprise custom-made individual parts, which can be connected to one another by means of an intuitive plug-in system so that a profile rail of a particular length and with a particular course can be provided. Advantageously, any inaccuracies, e.g., due to non-maintained manufacturing tolerances or potential thermal changes in length, can already be compensated during assembly. Furthermore, it is advantageously possible, due to a modular system, to produce an individual profile rail quickly and efficiently so that different vehicles with individual profile rails for door guides with respect to the length and the course can also be equipped by means of the above profile rail pieces. In order to simplify assembly, the individual profile rail pieces are intuitively connected to one another via a plug-in system. This advantageously increases ease of assembly, reduces the need for tools to a minimum and maintains narrow manufacturing tolerances. A plug-in system also provides the advantage that a profile rail can be disassembled again or extended at any time in order to variably adapt the profile rail with respect to its length and its course, for example. Moreover, reject goods as a result of defect production of a profile rail are advantageously avoided since the individual standardized profile rail pieces can be detachably connected and are accordingly used in other profile rails. A further advantage of a plug-in system for a door guide is that if a portion of the profile rail is damaged, for example as a result of a collision, the entire profile rail does not necessarily have to be replaced, but only the defective portion is replaced by an intact profile rail piece.

According to one aspect of the present disclosure, a profile rail for a door guide of a vehicle is created, comprising a first profile rail piece with a first end face and with a second end face, and a connecting piece, wherein the connecting piece has a first end and a second end, wherein the first end of the connecting piece has a first end-face connection region for connecting to the first profile rail piece, wherein the connecting piece is designed as a separate profile rail piece, and wherein the connecting piece can be connected via the first end-face connection region to at least one end face of the first profile rail piece by means of a plug-in system. The profile rail is characterized in that the first end-face connection region is arranged in a first connection plane which has a first angle to a first plane normal to an extension of the connecting piece. Advantageously, an oblique first connection region of the connecting piece and a complementary oblique first end face of the first profile rail piece improve a plugging-together of the connecting piece and of the first profile rail piece since contact between the first connection region of the connecting piece and the first end face of the first profile rail piece is virtually gap-free. Moreover, the roller properties of a support roller of the door guide are advantageously facilitated since the support roller is displaced without jerks and smoothly at a transition from the connecting piece and the first profile rail piece through an almost gap-free and continuous design of the transition, wherein a displacement direction of the support roller meets a gap at an angle of less than 90°.

According to one aspect of the present disclosure, a profile rail for a door guide of a vehicle is created, comprising a first profile rail piece with a first end face and with a second end face, and a connecting piece, wherein the connecting piece has a first end and a second end, wherein the first end of the connecting piece has a first end-face connection region for connecting to the first profile rail piece, wherein the connecting piece is designed as a separate profile rail piece, and wherein the connecting piece can be connected via the first end-face connection region to at least one end face of the first profile rail piece by means of a plug-in system. The profile rail is characterized in that the connecting piece comprises an upper connecting piece part and a lower connecting piece part, and that the upper connecting piece part and the lower connecting piece part can be connected to one another along a connecting line extending, at least in sections, transversely with respect to the first end-face connection region. Flexibility of mounting by means of a two-part connecting piece is advantageously increased in order to compensate for any manufacturing tolerances.

According to one aspect of the present disclosure, a profile rail for a door guide of a vehicle is created, comprising a first profile rail piece with a first end face and with a second end face, and a connecting piece, wherein the connecting piece has a first end and a second end, wherein the first end of the connecting piece has a first end-face connection region for connecting to the first profile rail piece, wherein the connecting piece is designed as a separate profile rail piece, and wherein the connecting piece can be connected via the first end-face connection region to at least one end face of the first profile rail piece by means of a plug-in system. The profile rail is characterized in that the first profile rail piece has, on a side facing the vehicle, a hollow chamber which is continuous at least in sections, in that a slot recess is formed in the hollow chamber, and in that a threaded bolt can be inserted with a head piece into the hollow chamber. Advantageously, the profile rail can be connected to a vehicle body of the vehicle by means of a concealed connecting means so that no disruptive elements, e.g., screws, can be seen by an observer from the outside, and that a potential corrosion source is advantageously eliminated. A further advantage is that the connecting means can be displaced within the hollow chamber so that assembly of the profile rail to the vehicle body is simplified in that manufacturing tolerances can be compensated by means of a displacement of the connecting means.

According to one aspect of the present disclosure, a profile rail for a door guide of a vehicle is created, comprising a first profile rail piece with a first end face and with a second end face, and a connecting piece, wherein the connecting piece has a first end and a second end, wherein the first end of the connecting piece has a first end-face connection region for connecting to the first profile rail piece, wherein the connecting piece is designed as a separate profile rail piece, and wherein the connecting piece can be connected via the first end-face connection region to at least one end face of the first profile rail piece by means of a plug-in system. The profile rail is characterized in that the connecting piece has at least one latching element with a resilient, elastic latching lug, and in that the latching lug of the connecting piece can be locked and unlocked with a counter latching element formed as a recess in the first profile rail piece. Advantageously, the connecting piece is easily and quickly plugged together with the first profile rail piece, wherein immediate locking takes place, wherein further connecting means can be dispensed with so that assembly takes place intuitively, without tools and quickly.

Expediently, the first profile rail piece has, on a side facing the vehicle, a hollow chamber which is continuous at least in sections, wherein a slot recess is expediently formed in the hollow chamber, and wherein a threaded bolt can expediently be inserted with a head piece into the hollow chamber. Advantageously, the profile rail can be connected to a vehicle body of the vehicle by means of a concealed connecting means so that no disruptive elements, e.g., screws, can be seen by an observer from the outside, and that a potential corrosion source is advantageously eliminated. A further advantage is that the connecting means can be displaced within the hollow chamber so that assembly of the profile rail to the vehicle body is simplified in that manufacturing tolerances can be compensated by means of a displacement of the connecting means. Alternatively, the threaded bolt and the head piece are formed separately, wherein the threaded bolt and the head piece can be connected to one another, for example via a screw connection. Furthermore, the threaded bolt could alternatively be designed as a rivet in order to connect the profile rail to a vehicle body via a rivet connection.

Advantageously, the slot recess has a width that is somewhat larger than an outer diameter of the threaded bolt so that the threaded bolt projects out of the slot recess, and so that the threaded bolt can be displaced along the slot recess with some play.

The hollow chamber and the slot recess expediently extend in the longitudinal direction of the first profile rail piece. In this way, a fastening means inserted into the hollow chamber, e.g., a head piece with a screwed-on threaded bolt or a hammer-head screw, can be reliably displaced along the first profile rail piece, which increases ease of assembly.

The first end-face connection region is advantageously arranged in a first connection plane which has a first angle to a first plane normal to an extension of the connecting piece. Advantageously, an oblique first connection region of the connecting piece and a complementary oblique first end face of the first profile rail piece improve a plugging-together of the connecting piece and of the first profile rail piece since contact between the first connection region of the connecting piece and the first end face of the first profile rail piece is virtually gap-free. Moreover, the roller properties of a support roller of the door guide are advantageously facilitated since the support roller is displaced without jerks and smoothly at a transition from the connecting piece and the first profile rail piece through an almost gap-free and continuous design of the transition, wherein a displacement direction of the support roller meets a gap at an angle of less than 90°.

Expediently, the first connection plane extends at a first angle with respect to the normal plane of the end-face connection region of between 20° and 70°, preferably between 25° and 35°, and particularly preferably between 28° and 32°. It was advantageously possible to determine that an end-face connection region at an angle of approximately 30°+1-2° produces optimal running smoothness and easy of movement of a support roller during a displacement within the profile rail.

According to a particularly preferred embodiment, it is provided that the second end of the connecting piece has a second end-face connection region for connecting to a second profile rail piece, that the second end-face connection region is arranged in a second connection plane which has a second angle to a second plane normal to an extension of the connecting piece, and that the second connection plane extends at a second angle with respect to the second normal plane of the second end-face connection region of between 20° and 70°, preferably between 25° and 35°, and particularly preferably between 28° and 32°. Advantageously, an oblique second connection region of the connecting piece and a complementary oblique first end face of the second profile rail piece improve a plugging-together of the connecting piece and of the second profile rail piece since contact between the second connection region of the connecting piece and the first end face of the second profile rail piece is virtually gap-free. Moreover, the roller properties of a support roller of the door guide are advantageously facilitated since the support roller is displaced without jerks and smoothly at a transition from the connecting piece and the second profile rail piece through an almost gap-free and continuous design of the transition, wherein a displacement direction of the support roller meets a gap at an angle of less than 90°. In addition, it was advantageously possible to determine that an end-face connection region at an angle of approximately 30°+/−2° produces optimal running smoothness and easy of movement of the support roller during a displacement within the profile rail.

Preferably, on a side facing the vehicle, the first connection plane of the first end-face connection region extends away from the first normal plane in an outward direction. Advantageously, a stability of the profile rail is increased in this way, whereby reliable opening and closing of a vehicle door is ensured.

It is preferably provided that the second connection plane of the second end-face connection region on a side facing the vehicle extends away from the second normal plane in an outward direction. Advantageously, a stability of the profile rail is increased in this way, whereby reliable opening and closing of a vehicle door is ensured.

It is preferably provided that the first end-face connection region has protrusions formed as plug-in elements and/or latching elements, and that the plug-in elements and the latching elements are arranged perpendicularly to the first normal plane. An intuitive plug-in system is advantageously provided, whereby assembly is carried out quickly and without tools.

The second end-face connection region expediently has protrusions formed as plug-in elements and/or latching elements, wherein the plug-in elements and the latching elements are expediently arranged perpendicularly to the second normal plane. An intuitive plug-in system is advantageously provided, whereby assembly is carried out quickly and without tools.

The first end face and/or the second end face of the first profile rail piece is expediently designed to be complementary with respect to the first end-face connection region of the connecting piece. Advantageously, very good contact is ensured via complementary connection surfaces, as a result of which the assembled profile rail provides a flush and gap-free running surface so that quiet and smooth displacement of a support roller is made possible.

According to a preferred embodiment, the first connection plane and the second connection plane are parallel. This advantageously increases ease of assembly so that the profile rail is assembled intuitively.

Particularly preferably, it is provided that the connecting piece has at least one latching element with a resilient, elastic latching lug, and in that the latching lug of the connecting piece can be locked and unlocked with a counter latching element formed as a recess in the first profile rail piece. Advantageously, the connecting piece is easily and quickly plugged together with the first profile rail piece, wherein immediate locking takes place, wherein further connecting means can be dispensed with so that assembly takes place intuitively, without tools and quickly.

According to a particularly preferred embodiment, it is provided that the connecting piece comprises an upper connecting piece part and a lower connecting piece part, and that the upper connecting piece part and the lower connecting piece part can be connected to one another along a connecting line extending, at least in sections, transversely with respect to the first end-face connection region. Flexibility of mounting by means of a two-part connecting piece is advantageously increased in order to compensate for any manufacturing tolerances.

According to a particularly preferred embodiment, it is provided that the upper connecting piece part has an upper latching lug, and that the lower connecting piece part has a lower latching lug. This advantageously ensures stability of the assembled profile rail in that forces occurring can be transmitted uniformly both from the upper connecting piece part and from the lower connecting piece part into the first profile rail piece. Furthermore, a tool-free and intuitive locking system is advantageously provided.

Preferably, the upper latching lug and the lower latching lug are arranged in parallel to one another, wherein the upper latching lug and the lower latching lug are preferably arranged facing away from one another. In this way, forces from almost all directions can advantageously be absorbed and transmitted in a latched state so that a reliable and stable profile rail is provided.

The upper connecting piece part and the lower connecting piece part are expediently connected to one another by plugging. A simple plug-in system is advantageously provided, which advantageously ensures stability of the assembled connecting piece. Furthermore, plugging-together advantageously takes place quickly and without tools.

According to a preferred embodiment, it is provided that the upper connecting piece part and the lower connecting piece part are produced from the same material. Advantageously, the same materials have an identical coefficient of thermal expansion so that a temperature-related thermal expansion does not produce any undesired effects. Furthermore, the production costs are advantageously less due to the same material selection.

The connecting piece is expediently produced from a plastic material. The plastic material with respect to the connecting piece may, for example, be a polyamide, polyvinyl chloride, polyoxymethylene or polypropylene, etc., which is produced by means of an injection molding process. Due to the fact that a plastic is much more flexible than a steel material or an aluminum material, a connecting piece made of plastic can be connected particularly easily to other profile rail pieces in that the connecting piece can be elastically deformable to a certain extent. Furthermore, a connecting piece made of plastic can also be plastically deformed particularly well. This is important, for example, in a potential subsequent joining process in which, for example, a clinching process is used. Due to the lower density of a plastic in comparison to a metallic component, the total weight of a composite profile rail is advantageously reduced. Furthermore, a connecting piece made of plastic can serve as a buffer in the case of thermal changes in length and can thus compensate for any changes in length of the metallic components. A further advantage of a connecting piece made of a plastic material is high corrosion resistance. In addition, operation of a composite profile rail in which plastic materials are used is advantageously quiet since plastics absorb disruptive noise and dampen potential vibrations. Due to the production of the connecting piece by means of an injection molding process, relatively complicated shapes with respect to the connecting piece can thus also be produced quickly both cost-effectively and in large quantities.

The first profile rail piece is preferably produced from a metallic material. Due to the fact that the first profile rail piece is produced from a metallic material, e.g., from a steel or an aluminum alloy, it advantageously increases the load-bearing capacity and the load capacity and thus also the service life of the door guide. Straight profile rail pieces are preferably produced from an aluminum alloy by means of an extrusion process. When using a steel or an aluminum alloy, the respective profile rail piece can be subjected, for example, to an anodization process or a coating process before final assembly on a vehicle body, in order to prevent wear and corrosion.

According to an alternative preferred embodiment, the first profile rail piece is produced from a plastic material. The plastic material with respect to the first profile rail piece and the connecting piece can, for example, be a polyamide, polyvinyl chloride, polyoxymethylene or polypropylene, etc. Due to the lower density of a plastic in comparison to a metallic component, the total weight of the profile rail is advantageously reduced. Furthermore, material and production costs can be significantly reduced in that the entire profile rail is made of plastic. In this case, all profile rail pieces including the connecting piece are produced cost-effectively by means of an injection molding process. In addition, operation of the profile rail produced from plastic is advantageously quiet since plastics absorb disruptive noise and dampen potential vibrations. Furthermore, all the profile rail pieces used, which are produced from the same material, have the same mechanical, thermal and chemical properties so that, for example, a thermal change in length, the profile rail experiences uniform thermal expansion or uniform thermal contraction due to the same thermal expansion coefficients. Advantageously, potentially occurring internal stresses within the assembled profile rail can thus be minimized, as a result of which reliable and quiet displacement of support and guide rollers is always ensured.

Particularly preferably, the plastic material is designed as an irradiation-crosslinked plastic material. Advantageously, cost-effective technical plastics can be changed by means of irradiation crosslinking with respect to their mechanical, thermal and chemical properties in such a way that they correspond to the properties of high-performance plastics. Irradiation-crosslinked plastics thus advantageously have an increased load-bearing capacity and increased load capacity and thus also an increased service life of the door guide. On the one hand, as a consequence of the plastic material used, the total weight of the profile rail is advantageously reduced considerably; on the other hand, the profile rail by means of the irradiation cross-linking advantageously has very good mechanical, thermal and chemical properties. Furthermore, the individual profile rail pieces and connecting pieces can be produced quickly and in high quantities by means of a cost-effective injection molding process.

The second end of the connecting piece expediently has a second end-face connection region for connecting to a second profile rail piece, wherein the second profile rail piece has a first end face and a second end face. In this case, the connecting piece can be connected via the second end-face connection region to at least one end face of the second profile rail piece by means of a plug-in system. Advantageously, the connecting piece can be used both as a central part between two profile rail pieces and as an end piece of a profile rail. This increases both the functionality and the ease of assembly with respect to the production and with respect to the application of the profile rail. Accordingly, the connecting piece can have a second end-face connection region which, like the first profile rail piece, can in turn be connected to the second profile rail piece by means of a plug-in system. The second profile rail piece can be formed either from a steel or from an aluminum alloy or from a plastic material corresponding to the first profile rail piece.

According to a preferred embodiment, the connecting piece has at least one curved portion with at least one radius. In this case, the connecting piece is advantageously used as a kind of corner connector or as a kind of angle connector, as a result of which an assembled profile rail extends by means of the corresponding profile rail pieces over a corner or at least in sections along a curved track. A connecting piece designed as a corner connector, which connects, for example, at least two profile rail pieces to one another, advantageously has an angle between 90° and 150°, preferably between 140° and 100°, and particularly preferably between 130° and 110°. An inner radius of the connecting piece is preferably between 50 millimeters and 100 millimeters and particularly preferably between 60 millimeters and 70 millimeters, as a result of which corresponding support and guide rollers of the door guide can be displaced smoothly along a curved guide track within the connecting piece. In this case, the connecting piece is substantially responsible for the angle between the first profile rail piece and the second profile rail piece so that, depending on the application, individual connecting pieces with different angles and radii can be used, as a result of which an assembly-friendly and flexible assembly is provided in order to assemble an individual profile rail and finally mount it to a vehicle body. Advantageously, straight and curved connecting pieces thus exist in order to also quickly and efficiently provide profile rails with curved portions by means of a modular plug-in system.

The first profile rail piece expediently has a first guide profile and the connecting piece has a second guide profile. In this case, the first guide profile of the first profile rail piece and the second guide profile of the connecting piece in an assembled state of the profile rail are in each case arranged so as to be aligned and flush with one another, as a result of which means for guiding and supporting a vehicle door can be displaced along the assembled profile rail. So that corresponding support and guide rollers and/or any sliding elements which are components of the door guide can be displaced smoothly and quietly within at least one guide track of the profile rail, the respective guide profiles are advantageously identical with respect to the individual profile rail pieces or connecting pieces. Moreover, the transitions between the individual profile rail pieces or connecting pieces are continuous and virtually gap-free in an assembled state of the profile rail. Accordingly, the respective guide profiles or at least the respective guide tracks with respect to the connecting piece and the at least one profile rail piece are oriented so as to be aligned, flush and butt-to-butt with one another. A guide track is to be understood as the regions of the guide profile that are contacted by the guide and support rollers and by further potential sliding elements during a displacement of the vehicle door. Furthermore, the entire guide track of the guide profile of the profile rail is advantageously smooth. As a result, a vehicle door can advantageously be opened or closed very smoothly, with a high running smoothness as well as quietly, either manually or by means of a motor.

Preferably, the first profile rail piece and the connecting piece each have a C-shaped cross section. A C-shaped cross section is advantageously particularly well suited to insert corresponding guide and support rollers into the guide profile of the profile rail and to displace them reliably therein, without an undesired decoupling between the profile rail and the guide and support rollers taking place. Furthermore, production of a C-shaped component, for example by means of an injection molding process for plastic parts or by means of an extrusion process for metallic parts, can be carried out easily and cost-effectively since a simple geometry with respect to the profile rail pieces is preferred overall. In addition, a C-shaped cross section advantageously has very good mechanical stability, as a result of which a high load-bearing and load capacity of the profile rail is ensured.

Preferably, from a leg of the C-shaped profile rail, a further leg protrudes at an angle of between 80° and 135°, preferably between 90° and 110°, and particularly preferably between 90° and 100°. Advantageously, the angled protruding leg of the C-shaped profile rail serves as a kind of abutment so that the guide and support rollers cannot laterally fall or slide out of the profile rail. The guide and support rollers are thus always reliably held in position within the guide track provided for the guide and support rollers.

According to a preferred embodiment, the connecting piece comprises at least one plug-in element and at least one guide element. The corresponding connection regions of the connecting piece advantageously have male connecting elements for a plug connection with profile rail pieces. These connecting elements include, inter alia, guiding and holding aids designed as vertical plates, each protruding from the connecting piece at the end face. Moreover, the connecting elements include plug-in and latching elements, each of which protruding from the connecting piece at the end face. The guiding and holding aids of the connecting piece support an orientation that is aligned and flush with a further profile rail piece in an assembled state of the profile rail. Furthermore, the guiding and holding aids as well as the plug-in and locking elements advantageously prevent the connecting piece from having a certain play in an assembled state of the profile rail so that the connecting piece advantageously does not change its position with respect to the connected profile rail piece in any direction. In addition, the plug-in elements can be equipped with at least one resilient, elastic latching lug so that the connecting piece has at least one latching element. A combination of latching and plug-in elements is advantageously used for a stable force-fitting or form-fitting plug connection of a connecting piece to a further profile rail piece. This is preferably a detachable plug connection with narrow tolerances so that the connecting piece is connected to the profile rail piece in a taut manner. In order to connect the connecting piece to the profile rail piece, the profile rail piece preferably has corresponding female hollow-chamber elements with respect to the male connecting elements of the connecting piece. Moreover, the profile rail piece preferably has at least one corresponding counter latching element which is designed as a recess. The elastic latching element or the elastic latching lug of the connecting piece can latch into the counter latching element in a force-fitting and form-fitting manner. Advantageously, a simple, fast and intuitive plug-in system for mounting a profile rail is provided by means of the corresponding male and female connecting elements, wherein no additional tool is required.

Alternatively, the connecting piece can comprise female hollow-chamber elements at least at one end, wherein at least one hollow-chamber element has at least one counter latching element. Accordingly, on at least one end face, the first profile rail piece and the second profile rail piece can respectively have associated male plug-in and latching elements for a plug connection with the connecting piece.

In an assembled state of the profile rail, the at least one guide element of the connecting piece preferably abuts on an inner side of the first profile rail piece or on an outer side of the first profile rail piece in the longitudinal direction of the first profile rail piece. In this case, in an assembled state of the profile rail, the connecting piece can advantageously be held stably in position in particular with respect to potentially occurring torsional forces so that an undesired rotation of the connecting piece is also always prevented. Overall, the protruding plug-in, latching and guide elements advantageously prevent the connecting piece from changing its position with respect to the first profile rail piece in any direction in an assembled state of the profile rail. Furthermore, a potential torsional rotation of the connecting piece is prevented so that the respective guide profiles or guide tracks are always oriented so as to be aligned and flush with one another in order to ensure easy, smooth and quiet displacement of support and guide rollers within the entire profile rail.

BRIEF DESCRIPTION OF THE DRAWINGS

Further advantages, properties, features, and developments of the present disclosure emerge from the following description.

The present disclosure is explained in more detail below with reference to the accompanying drawings.

DETAILED DESCRIPTION

Figure 1:
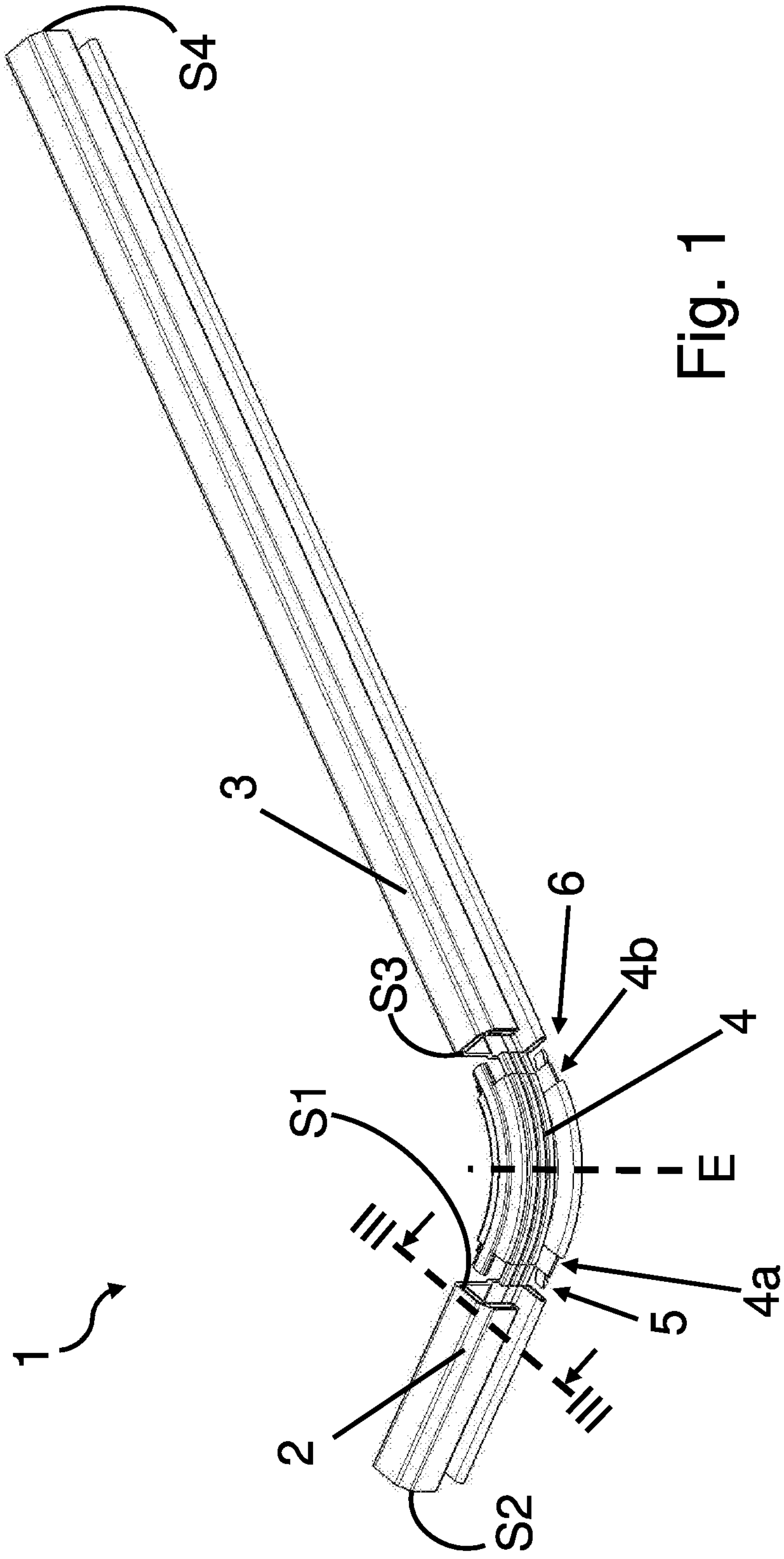
FIG. 1 shows a perspective exploded view of a first exemplary embodiment of a profile rail.

FIG. 1 shows a perspective schematic view of an exploded representation of a first exemplary embodiment of a three-piece profile rail 1, which comprises a first straight profile rail piece 2, a second straight profile rail piece 3 and a curved connecting piece 4 arranged between the two profile rail pieces 2 and 3. The connecting piece 4 is thus designed as a third profile rail piece. The first profile rail piece 2 has a first end face S1 in a direction to the connecting piece 4, wherein the first profile rail piece 2 has a second end face S2 in a direction away from the connecting piece 4. Correspondingly to the first profile rail piece 2, the second profile rail piece 3 has a first end face S3 in a direction to the connecting piece 4, wherein the second profile rail piece 3 has a second end face S4 in a direction away from the connecting piece 4. The connecting piece 4, which is curved in sections, comprises a first end 4*a*, which faces the first end face S1 of the first profile rail piece 2, and a second end 4*b*, which faces the first end face S3 of the second profile rail piece 3. On the one hand, the first end 4*a* of the connecting piece 4 comprises a first end-face connection region 5 for connecting to the first profile rail piece 2 and, on the other hand, the second end 4*b* of the connecting piece 4 comprises a second end-face connection region 6 for connecting to the second profile rail piece 3. The connecting piece 4 is symmetrical with respect to a bisecting center plane E. The first connection region 5 and the second connection region 6 thus advantageously have the same or a mirror-symmetrical geometry.

Figure 2:
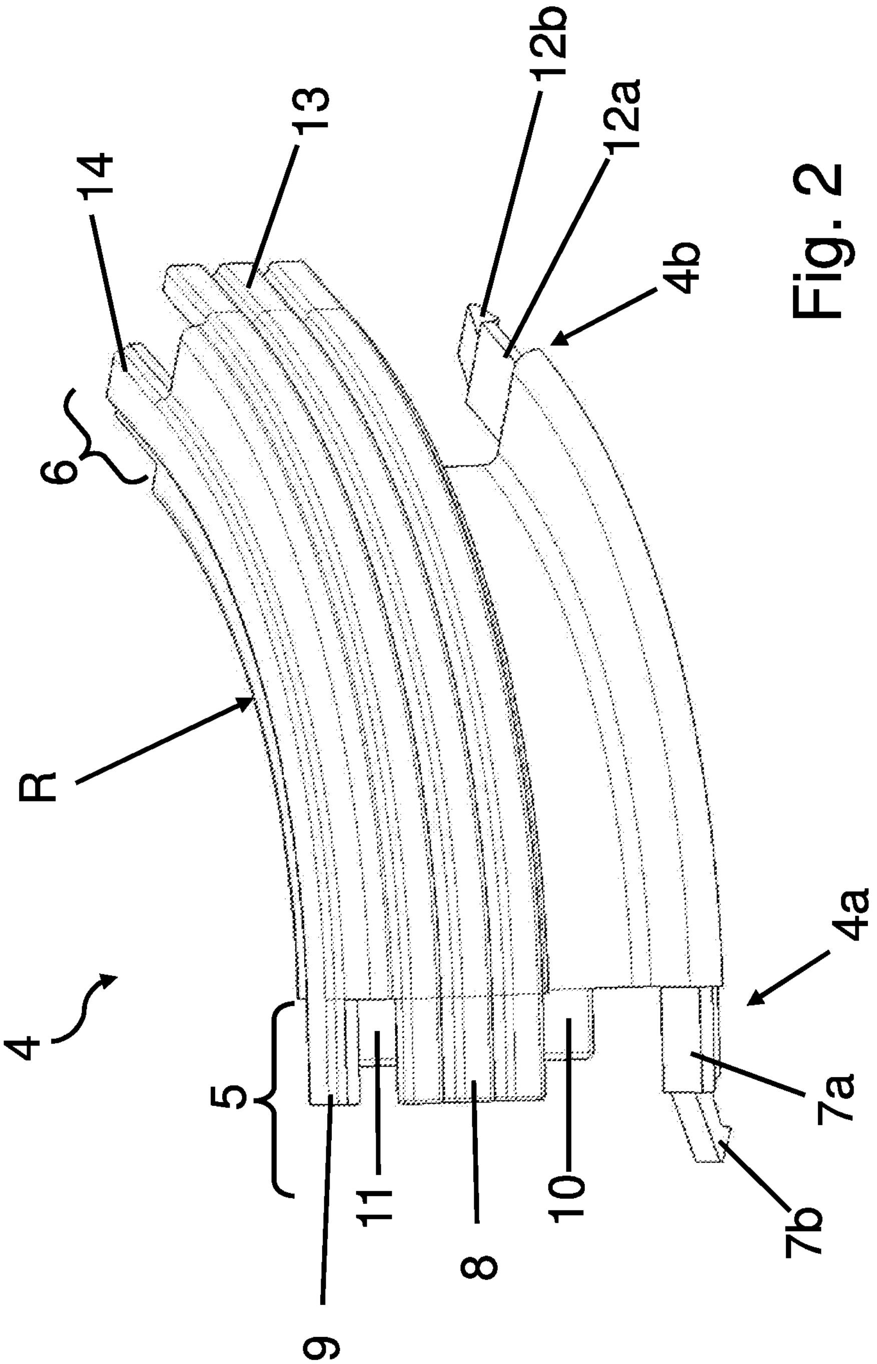
FIG. 2 shows a perspective view of a curved connecting piece of the profile rail of FIG. 1.

FIG. 2 shows, in an enlarged view, the curved connecting piece 4 with an inner radius R from FIG. 1, wherein the first connection region 5 has a first linear latching element 7*a* with a first latching lug 7*b*, a first linear plug-in element 8 and a second linear plug-in element 9. Furthermore, the first connection region 5 of the connecting piece 4 contains a first linear guide element 10 and a second linear guide element 11, which are each designed as flat thin-walled plates. The second connection region 6 of the connecting piece 4 has a first linear latching element 12*a* with a first latching lug 12*b*, a first linear plug-in element 13 and a second linear plug-in element 14. Furthermore, the second connection region 6 of the connecting piece 4 contains a first linear guide element 15, which can be seen in FIG. 4, and a second linear guide element 16, which can be seen in FIG. 5. Due to their guiding and holding function, the guide elements 10; 11; 15; 16 prevent a rotation or a change in position in any direction of the connecting piece 4 in an assembled state of the profile rail 1. Overall, the connecting piece 4 with its latching and plug-in elements 7*a*; 7*b*; 8; 9; 12*a*; 12*b*; 13; 14 and with its guide elements 10; 11; 15; 16 is formed uniformly or from a casting.

Figure 3:
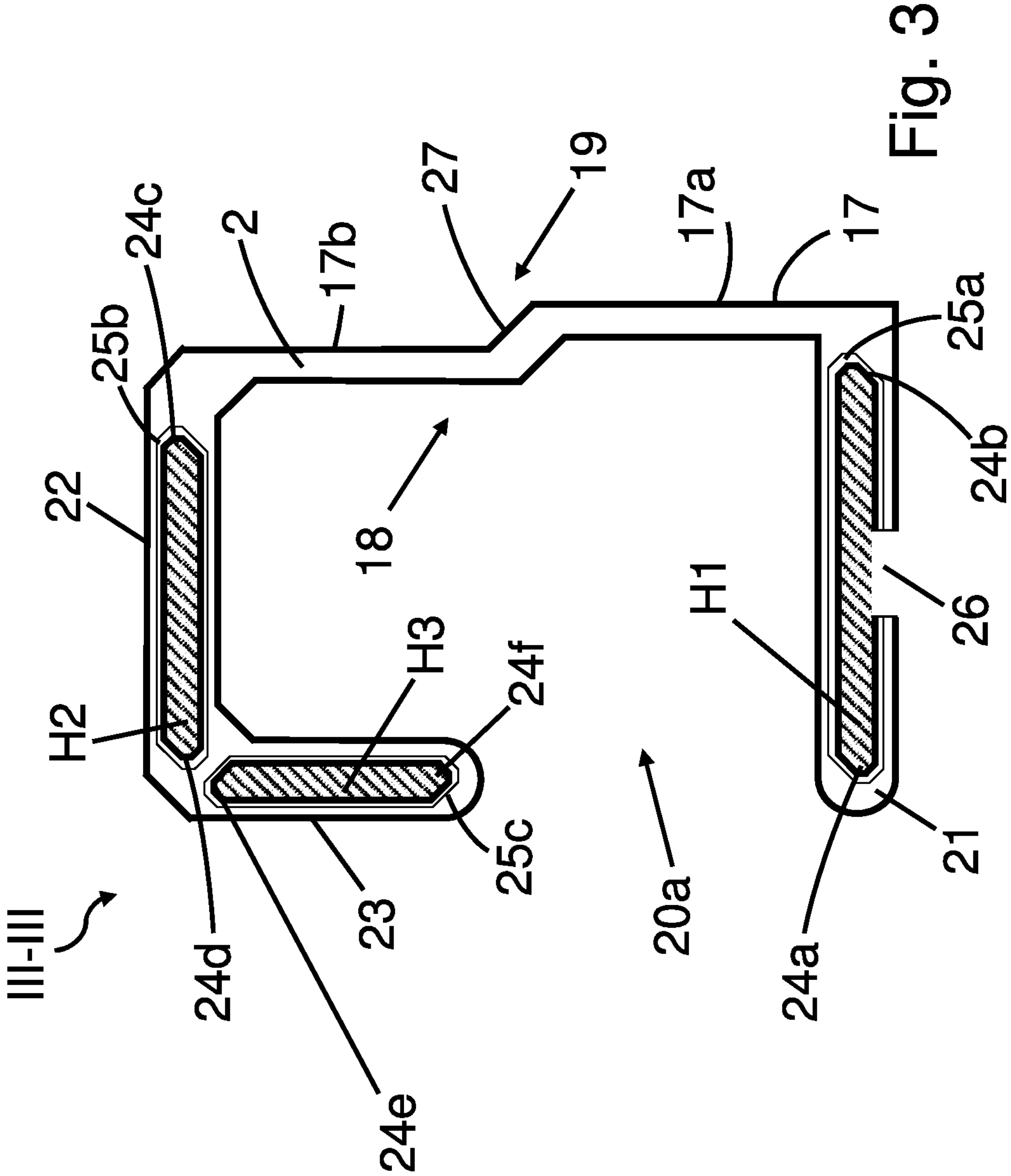
FIG. 3 shows a cross section along the line III-Ill of the first profile rail piece of FIG. 1.

FIG. 3 shows a C-shaped cross section along the line III-Ill of the profile rail piece 2 of FIG. 1. The C-shaped cross section of the profile rail piece 2 has a base 17 designed as a vertical wall with an inner side 18 and an outer side 19. A first guide profile 20*a* of the profile rail piece 2, in which the guide and support rollers can be displaced, is accordingly located on a side facing the inner side 18. Furthermore, the base 17 has a lower leg 21 and an upper leg 22, wherein a third leg 23 extends from the upper leg 22 at the end face in a direction to the lower leg 21. The lower leg 21 has a first hollow chamber H1 in which a counter latching element 26 is arranged. The upper leg 22 has a second hollow chamber H2 and the third leg 23 has a third hollow chamber H3. The hollow chambers H1, H2; H3 and the counter latching element 26 of the first profile rail piece 2 are provided as female receiving elements for the respective male plug-in and latching elements 7*a*; 7*b*; 8; 9 of the connecting piece 4 of FIG. 2. Furthermore, the hollow chambers H1, H2; H3 of the first profile rail piece 2 have rounded corners 24*a*; 24*b*; 24*c*; 24*d*; 24*e*; 24*f* and lead-in chamfers 25*a*; 25*b*; 25*c*. The lead-in chamfers 25*a*; 25*b*; 25*c* are each arranged at an entry into a hollow chamber H1, H2; H3 and completely comprise a circumference of the respective hollow chamber H1, H2; H3 so that the plug-in and latching elements 7*a*; 7*b*; 8; 9 of the connecting piece 4 can be inserted smoothly into the corresponding hollow chambers H1, H2; H3 of the first profile rail piece 2. The counter latching element 26, which is arranged in the lower leg 21 of the profile rail piece 2, is designed as a through-hole into which the latching lug 7*b* of the latching element 7*a*; 7*b* of the connecting piece 4 of FIG. 2 can latch in a form-fitting manner when the connecting piece 4 is plugged together with the profile rail piece 2. Moreover, the base 17 comprises a step-like bend 27 so that a lower region 17*a* of the base 17 and an upper region 17*b* of the base 17 are arranged offset to one another.

Figure 4:
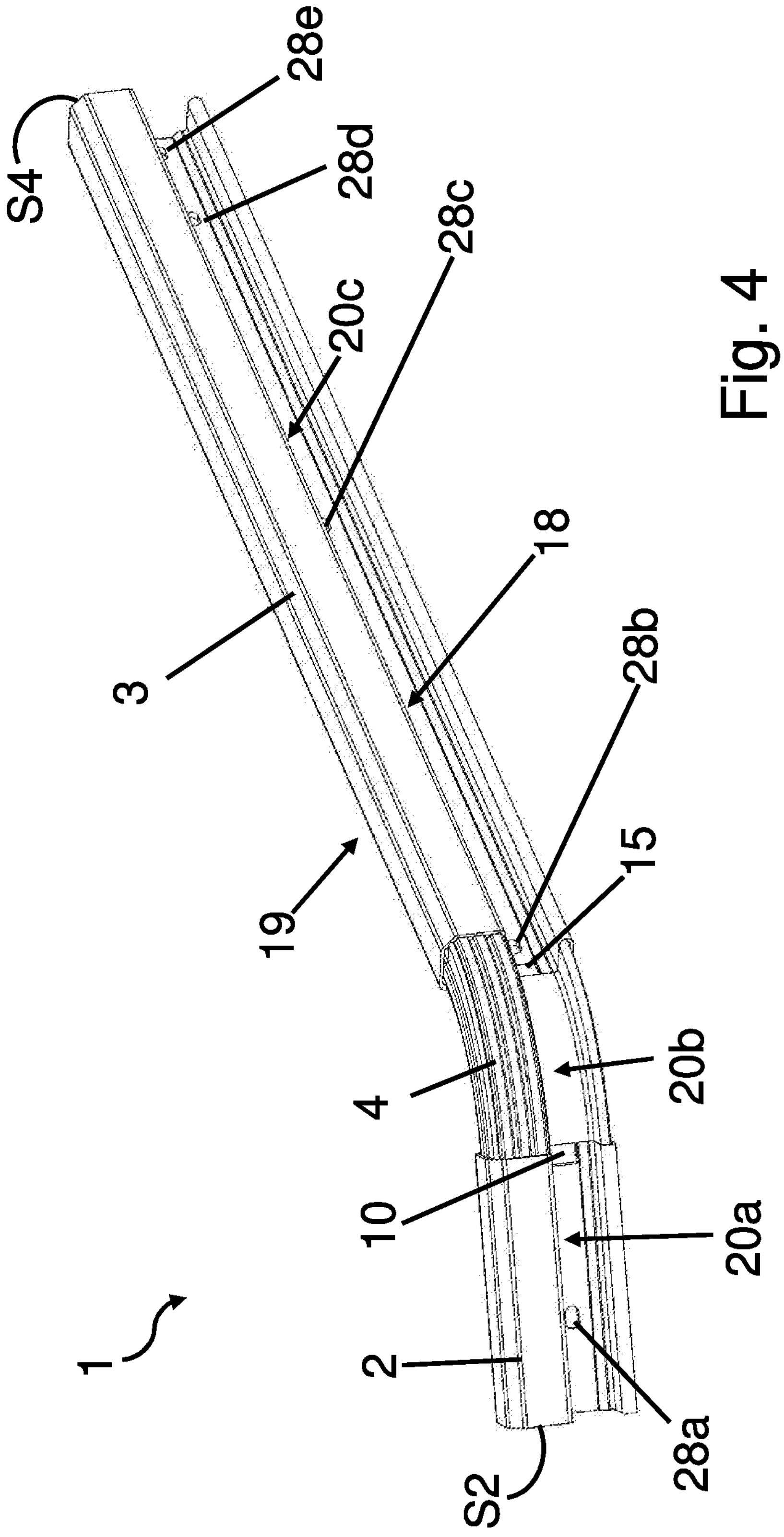
FIG. 4 shows a perspective view of the profile rail of FIG. 1 in an assembled state.

FIG. 4 shows a profile rail 1 assembled from the separate profile rail pieces 2; 3; 4 of FIG. 1. The profile rail 1 is designed for use in a door guide for a vehicle. The profile rail 1 shown in FIG. 4 serves to guide support and guide means (not shown in greater detail here) of a vehicle sliding door and extends substantially axially along a main sliding direction of the vehicle sliding door. In order to mount the profile rail 1 on a vehicle body, the first profile rail piece 2 and the second profile rail piece 3 each have at least one elongated hole 28*a*; 28*b*; 28*c*; 28*d*; 28*e*. The profile rail 1 can be connected to a vehicle body with the aid of force-fitting and form-fitting connecting means, e.g., screws, which pass through the elongated holes 28*a*; 28*b*; 28*c*; 28*d*; 28*e* of the first profile rail piece 2 and of the second profile rail piece 3. Furthermore, FIG. 4 shows the guide elements 10; 15 of the connecting piece 4, which are arranged on the inner side 18 of the profile rail 1. Here, the guide element 10 of the connecting piece 4 extends in the longitudinal direction with respect to the first profile rail piece 2 in a direction to the second end face S2 of the first profile rail piece 2. The guide element 15 of the connecting piece 4 extends in the longitudinal direction with respect to the second profile rail piece 3 in a direction to the second end face S4 of the second profile rail piece 3. The first profile rail piece 2 has a first guide profile 20*a*. The connecting piece 4 has a second guide profile 20*b*, and the second profile rail piece 3 has a third guide profile 20*c*. So that corresponding support and guide rollers can be perfectly displaced within the guide profiles 20*a*; 20*b*; 20*c*, the assembled profile rail 1 has a flush and aligned transition between the first profile rail piece 2 and the connecting piece 4 and between the second profile rail piece 3 and the connecting piece 4 so that the guide profiles 20*a*; 20*b*; 20*c* of the first profile rail piece 2, of the second profile rail piece 3 and of the connecting piece 4 form a unit, as a result of which the support and guide rollers can be displaced quietly and with high running smoothness within the assembled profile rail 1. Furthermore, the respective transitions of the profile rail 1 are designed to be virtually gap-free and continuous.

Figure 5:
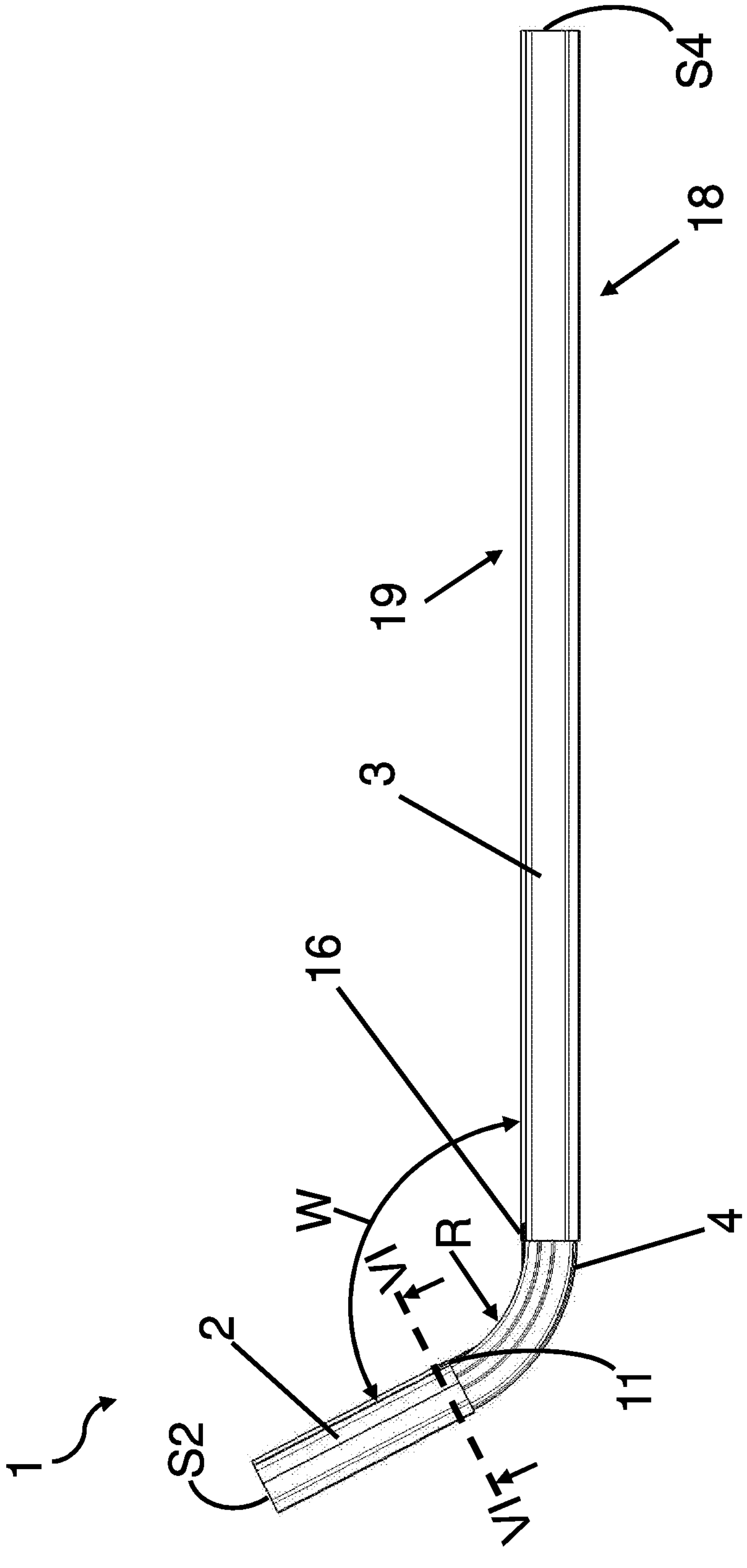
FIG. 5 shows the profile rail of FIG. 4 in a view from above.

FIG. 5 shows the assembled profile rail 1 of FIG. 4 in a view from above. In that the connecting piece 4 has a curved portion with an inner radius R, the first profile rail piece 2 and the second profile rail piece 3 are arranged at an angle W to one another due to the connecting piece 4. The angle W here is 120°. Furthermore, the inner radius R of the connecting piece 4 in this exemplary embodiment is 65 millimeters so that a rounded and uniform transition from the first profile rail piece 2 to the second profile rail piece 3 is ensured by the connecting piece 4. Furthermore, the outer side 19 of the profile rail 1 can be seen in FIG. 5 so that the guide elements 11; 16 of the connecting piece 4 can be seen. Here, the guide element 11 of the connecting piece 4 extends in the longitudinal direction with respect to the first profile rail piece 2 in a direction to the second end face S2 of the first profile rail piece 2. The guide element 16 of the connecting piece 4 extends in the longitudinal direction with respect to the second profile rail piece 3 in a direction to the second end face S4 of the second profile rail piece 3.

Figure 6:
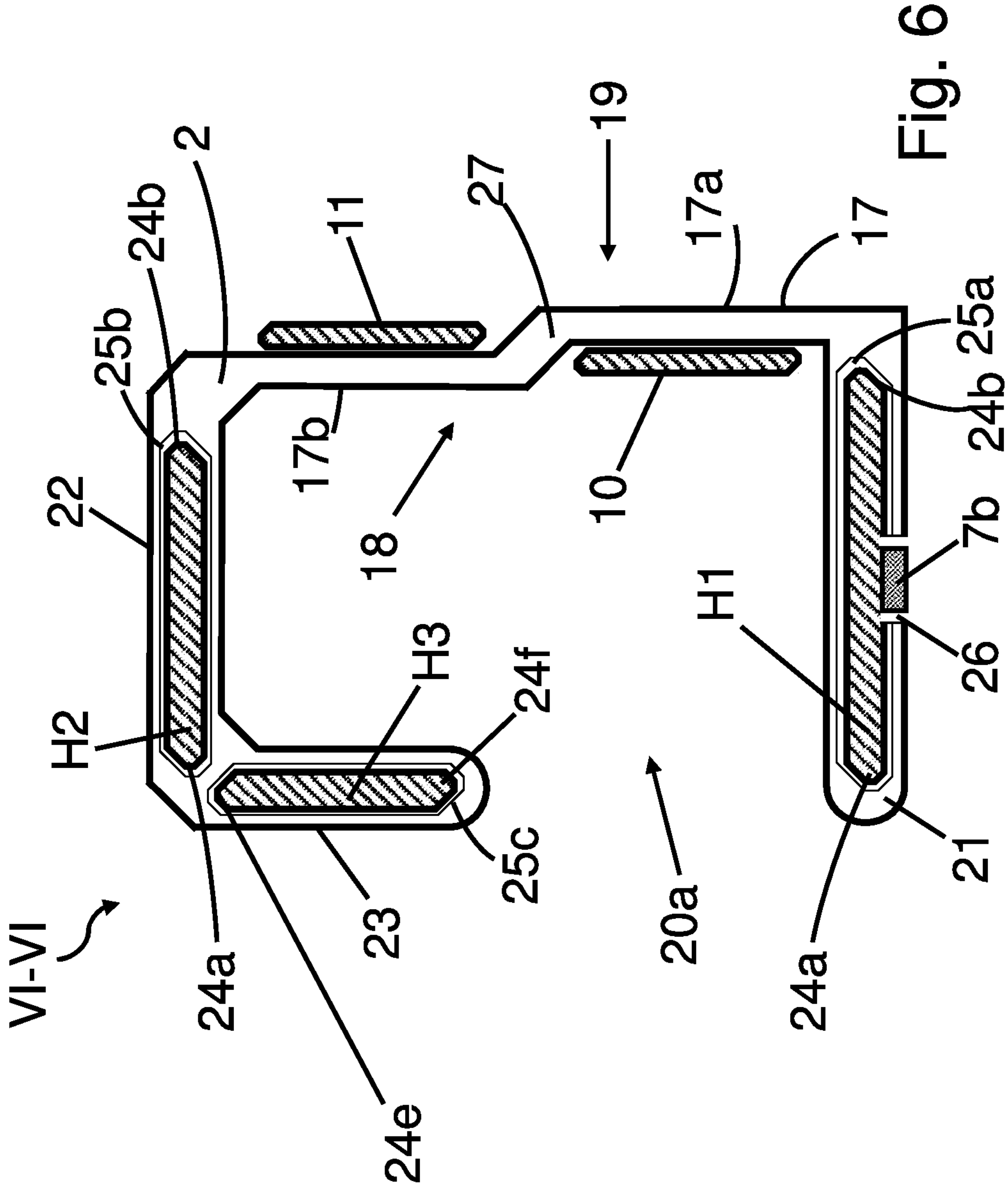
FIG. 6 shows a cross section along the line VI-VI of the first profile rail piece of FIG. 5.
Figure 7:
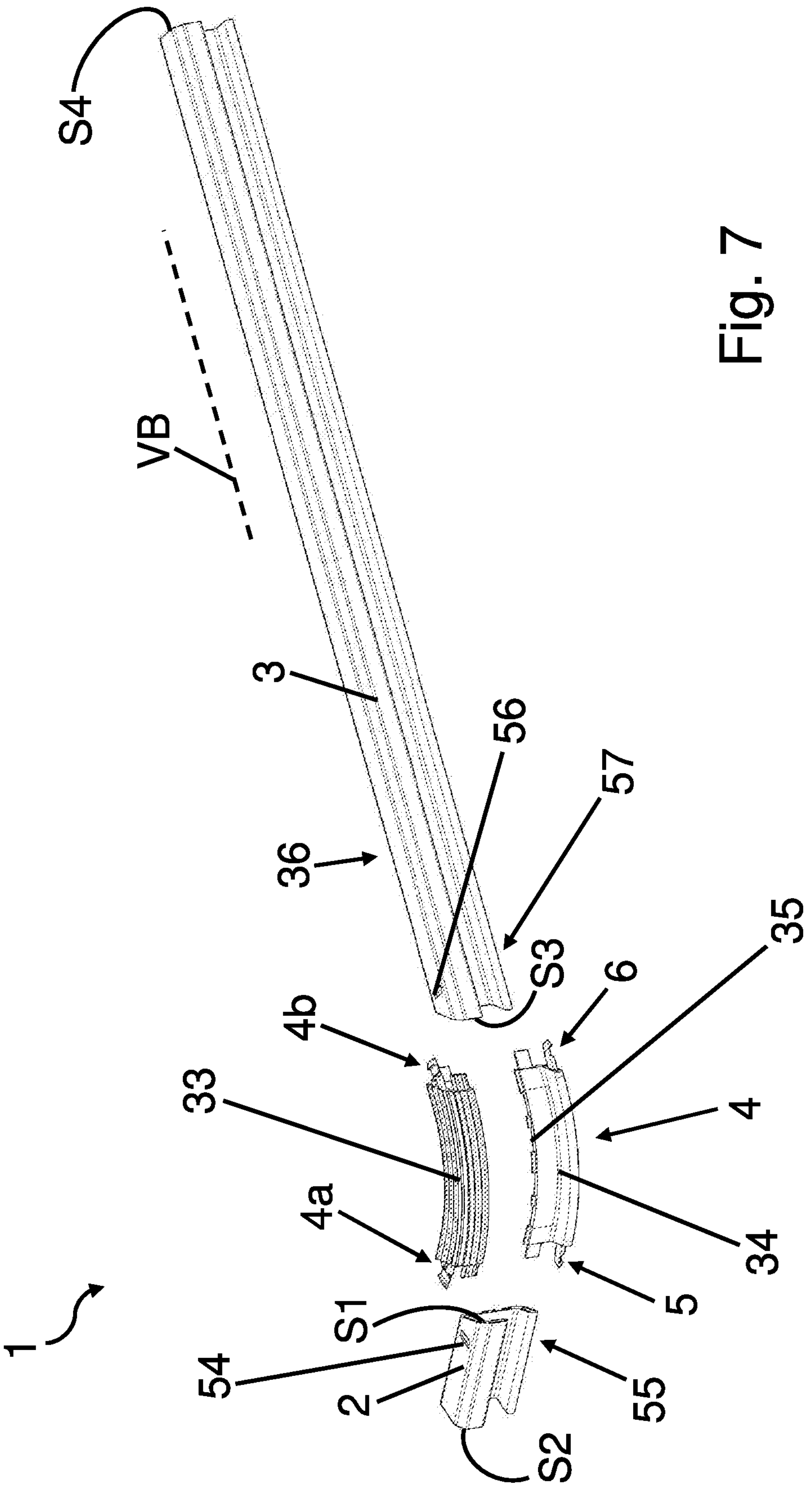
FIG. 7 shows a perspective exploded view of a second exemplary embodiment of the profile rail according to the present disclosure.

FIG. 6 shows a C-shaped cross section along the line VI-VI of the profile rail piece 2 of FIG. 5. In a plugged-together state of the profile rail 1, the guide elements 10; 11 of the connecting piece 4 are respectively arranged in the longitudinal direction of the profile rail piece 2 so as to abut on the inner side 18 and on the outer side 19 of the base 17. Here, the first guide element 10 of the connecting piece 4 is located on the inner side 18 in the lower region 17*a* of the base 17. The second guide element 11 of the connecting piece 4 is located on the outer side 19 in the upper region 17*b* of the base 17. As a result, due to this arrangement clamping the base 17, undesired rotation of the connecting piece 4 with respect to the first profile rail piece 2 is prevented. Furthermore, FIG. 6 shows the latching lug 7*b* of the connecting piece 4 in the lower leg 21 of the first profile rail piece 2, which is in engagement with the counter latching element 26, as a result of which the connecting piece 4 is fixed in the first profile rail piece 2.

Correspondingly to the first profile rail piece 2, the second profile rail piece 3 has the same cross-sectional profile so that the second profile rail piece 3 can be plugged together with the connecting piece 4 via the connection region 6 at the second end 4*b*, which is symmetrical with respect to the first end 4*a*.

In order to connect the connecting piece 4 to the first profile rail piece 2 in a form-fitting manner, the connecting piece 4 and the first profile rail piece 2 must initially be arranged butt-to-butt so that, for example, the first end 4*a* of the connecting piece 4 is oriented in parallel to the first end face S1 of the first profile rail piece 2. Moreover, the connecting piece 4 and the first profile rail piece 2 each have a C-shaped cross section so that the first end 4*a* of the connecting piece 4 and the first end face S1 of the first profile rail piece are oriented congruently with respect to their C-shaped cross section. In this respect, it should also be noted that the plug-in and latching elements 7*a*; 7*b*; 8; 9 are each oriented concentrically and coaxially with respect to the hollow chambers H1, H2; H3 of the first end face S1 of the first profile rail piece 2 so that the plug-in and latching elements 7*a*; 7*b*; 8; 9 can be inserted into the respective hollow chambers H1, H2; H3, which are located within the end face S1. The latching element 7*a* with the latching lug 7*b* is assigned to the first hollow chamber H1 with the counter latching element 26. The plug-in element 8 is assigned to the third hollow chamber H3 and the plug-in element 9 is assigned to the second hollow chamber H2. Furthermore, it should be noted that the guide profile 20*a* of the first profile rail piece 2 and the guide profile 20*b* of the connecting piece 4 are arranged so as to be parallel, aligned and flush with one another. As soon as the corresponding orientation of the first profile rail piece 2 and of the connecting piece 4 has been carried out, the connecting piece 4 can be inserted with its plug-in and latching elements 7*a*; 7*b*; 8; 9 into the corresponding hollow chambers H1, H2; H3 of the first profile rail piece 2, and thus plugged together, until the latching lug 7*b* of the connecting piece 4 engages in the counter latching element 26 in the lower leg 21. In this way, a force-fitting and form-fitting plug connection is formed between the connecting piece 4 and the first profile rail piece 2. The counter latching element 26 is arranged in the guide profile 20*a* of the first profile rail piece 2 in the lower leg 21. Furthermore, the counter latching element 26 is designed as a through-hole in the lower leg 21 of the first profile rail piece 2 so that the latching lug 7*b* is freely accessible on the underside thereof. By pressing the underside of the latching lug 7*b* in a direction to the upper leg 22 of the profile rail piece 2, the latching lug 7*b* can be displaced into a position outside the counter latching element 26 in that the latching lug 7*b* is displaced upward until the latching lug 7*b* is disengaged from the counter latching element 26. If the latching lug 7*b* is located outside the counter latching element 26, it is possible to separate the connecting piece 4 and the first profile rail piece 2 from one another by pulling them apart. In this case, the plug connection between the connecting piece 4 and the first profile rail piece 2 can be separated in a simple manner without using a tool so that the plug-in and latching elements 7*a*; 7*b*; 8; 9 of the connecting piece 4 can be pulled out of the respective hollow chambers H1; H2; H3 of the first profile rail piece 2. As a result, two separate profile rail pieces, namely the connecting piece 4 and the first profile rail piece 2, are again obtained.

In order to connect the second profile rail piece 3 to the second end 4*b* of the connecting piece 4, the above steps are carried out correspondingly to the connection of the first profile rail piece 2. Separation of the connection between the connecting piece 4 and the second profile rail piece 3 is likewise carried out correspondingly to the first profile rail piece 2 as described above. Due to the fact that the first profile rail piece 2 and the second profile rail piece 3 are connected to the connecting piece 4, a profile rail 1, which is shown in FIG. 4, is assembled in this way and is thus provided for use in a door guide of a vehicle.

Production of the curved connecting piece 4, which consists of a plastic, takes place by means of an injection molding process since the injection molding process can economically produce any shapes with any wall thicknesses in a large quantity. The material of the first profile rail piece 2 and of the second profile rail piece 3 is an aluminum alloy, wherein the two straight profile rail pieces 2 and 3 are produced by means of an extrusion process. By using aluminum alloys, a required load-bearing capacity and load capacity of the door guide is ensured so that vehicle doors with increased weight can also be reliably used and put into operation.

Overall, the profile rail 1 has a modular design in that any rail guides can be produced in a versatile manner as a result of a modular plug-in system. As a result of the modular design of the profile rail 1, multiple curved or straight connecting pieces 4 can be plugged together with further profile rail pieces 2 and 3 since the respective end faces S1; S2; S3; S4 of the profile rail pieces 2 and 3 and the ends 4*a*; 4*b* as well as the connection regions 5; 6 of the connecting piece 4 are always matched with one another. As a result, it is possible to assemble any individual guide tracks of a profile rail 1. The advantage is that required manufacturing and installation tolerances can always be maintained so that a reproducible assembly on a vehicle is always made possible. This creates standardized individual components of a profile rail 1 for a door guide, which are exactly matched with one another. Furthermore, a basis for robot-assisted automation of the assembly is thus created. The profile rail 1 finally ensures quiet operation and a long service life, whereby a corresponding door guide is characterized by very high quality.

The plug connection technique of the profile rail 1 explained above comprises a first form-fitting plug connection component which is produced by the latching element 7*a*; 7*b* of the connecting piece 4 and of the associated counter latching element 26 of the first profile rail piece 2 as a result of an engagement. The profile rail 1 also comprises a second force-fitting plug connection component in that the plug-in elements 8; 9, a first plug-in region of the latching element 7*a* and the guide elements 10; 11 of the connecting piece 4 abut in a frictional and clamping manner, in the fashion corresponding to a press fit, in the lower region 17*a* and in the upper region 17*b* of the base 17 and in the hollow chambers H1, H2; H3 of the first profile rail piece 2. Furthermore, an alternative plug connection technique of the profile rail 1 could be carried out exclusively via force fit in that no latching elements are provided so that a disassembly of the profile rail 1 into its individual parts 2; 3; 4 can be carried out even more easily and more quickly.

FIGS. 7 to 10 show a preferred second exemplary embodiment of the profile rail 1 according to the present disclosure. In this case, the second exemplary embodiment of the profile rail 1 has several differences with respect to the first exemplary embodiment.

One difference is that the connecting piece 4, which is shown enlarged, inter alia, in FIGS. 11 to 14, is now composed of two parts.

Figure 11:
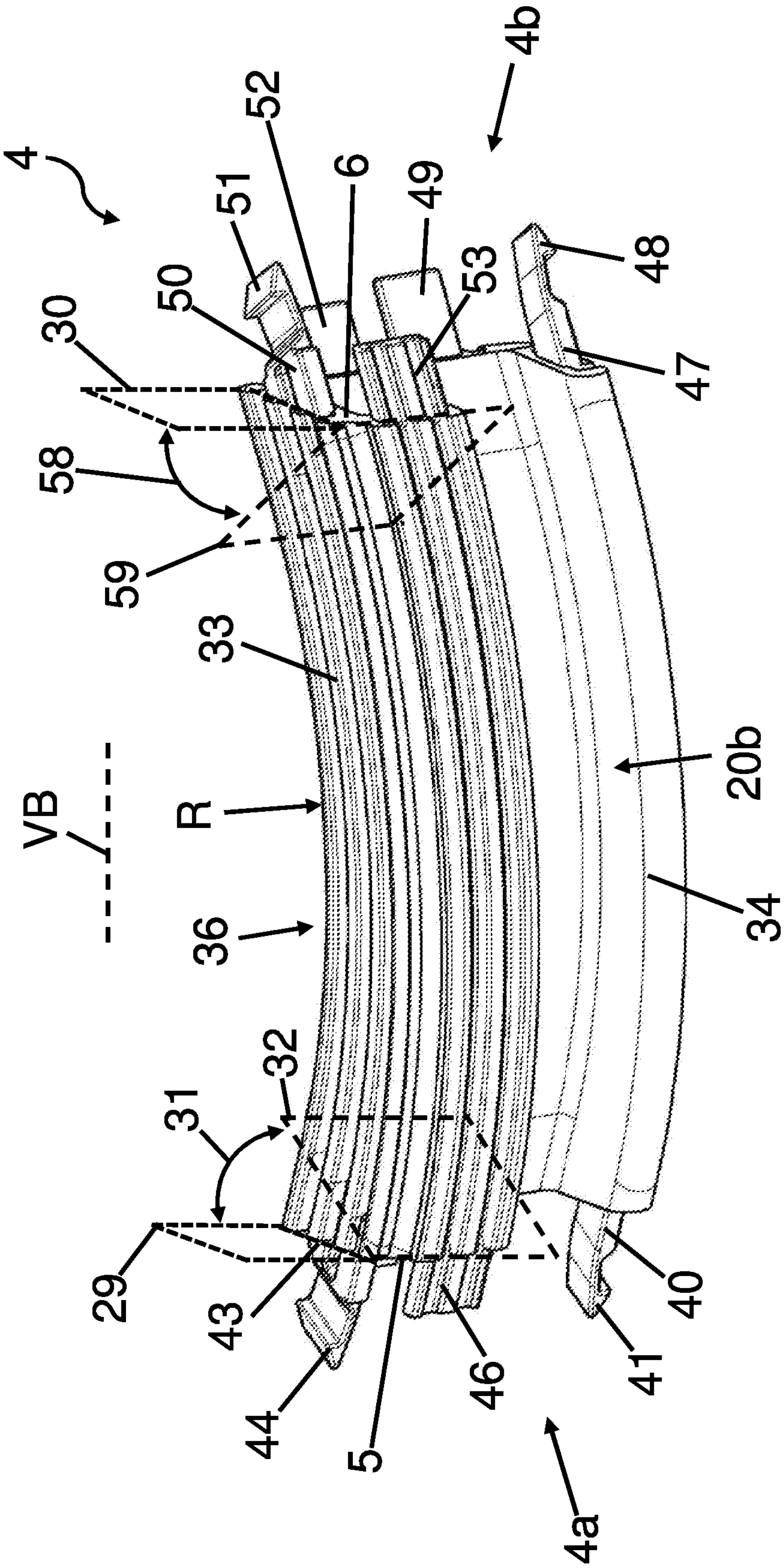
FIG. 11 shows a perspective view of a curved two-part connecting piece in a plugged-together state of FIG. 10.
Figure 12:
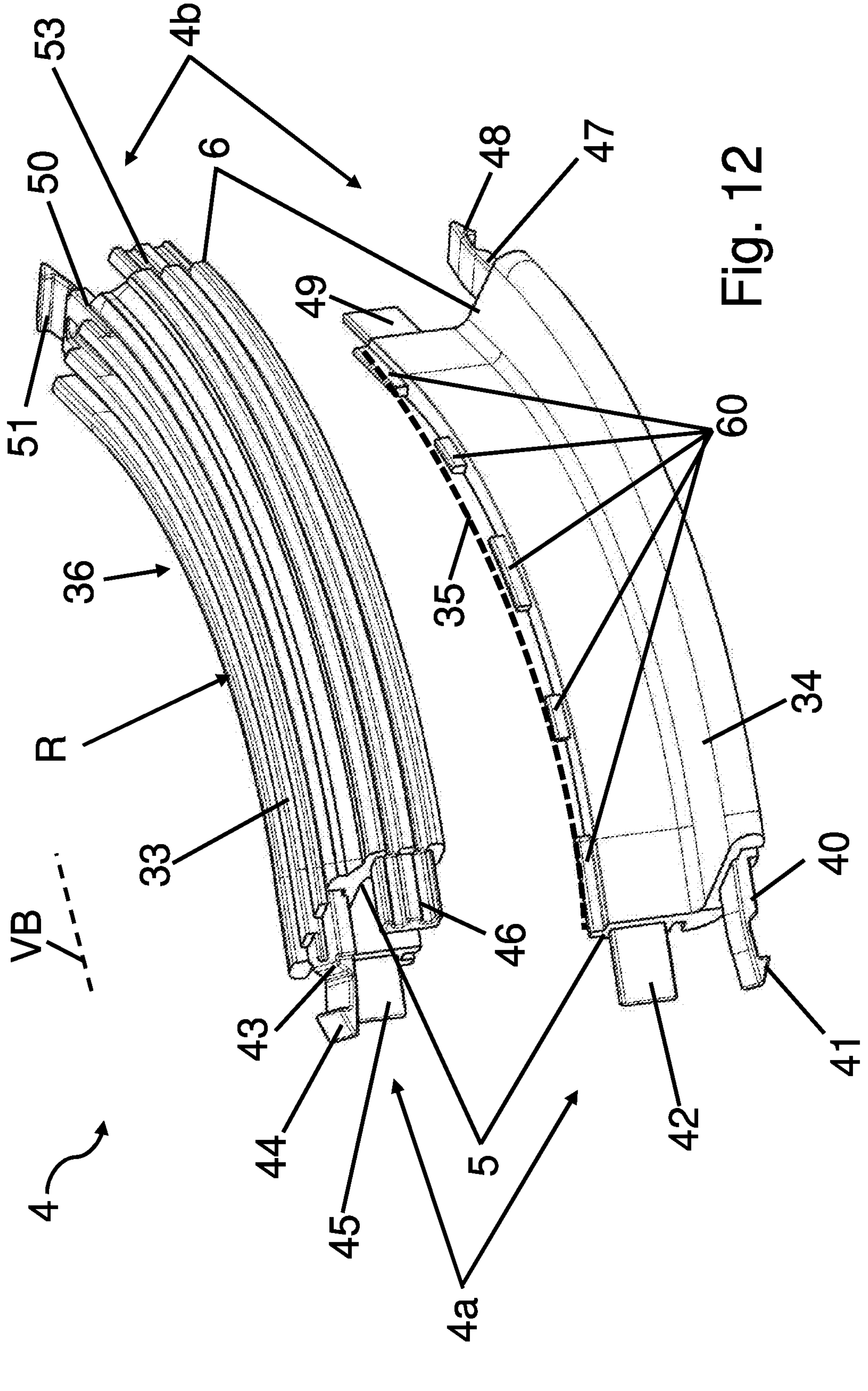
FIG. 12 shows a perspective exploded view of the curved two-part connecting piece of the profile rail of FIG. 11.
Figure 13:
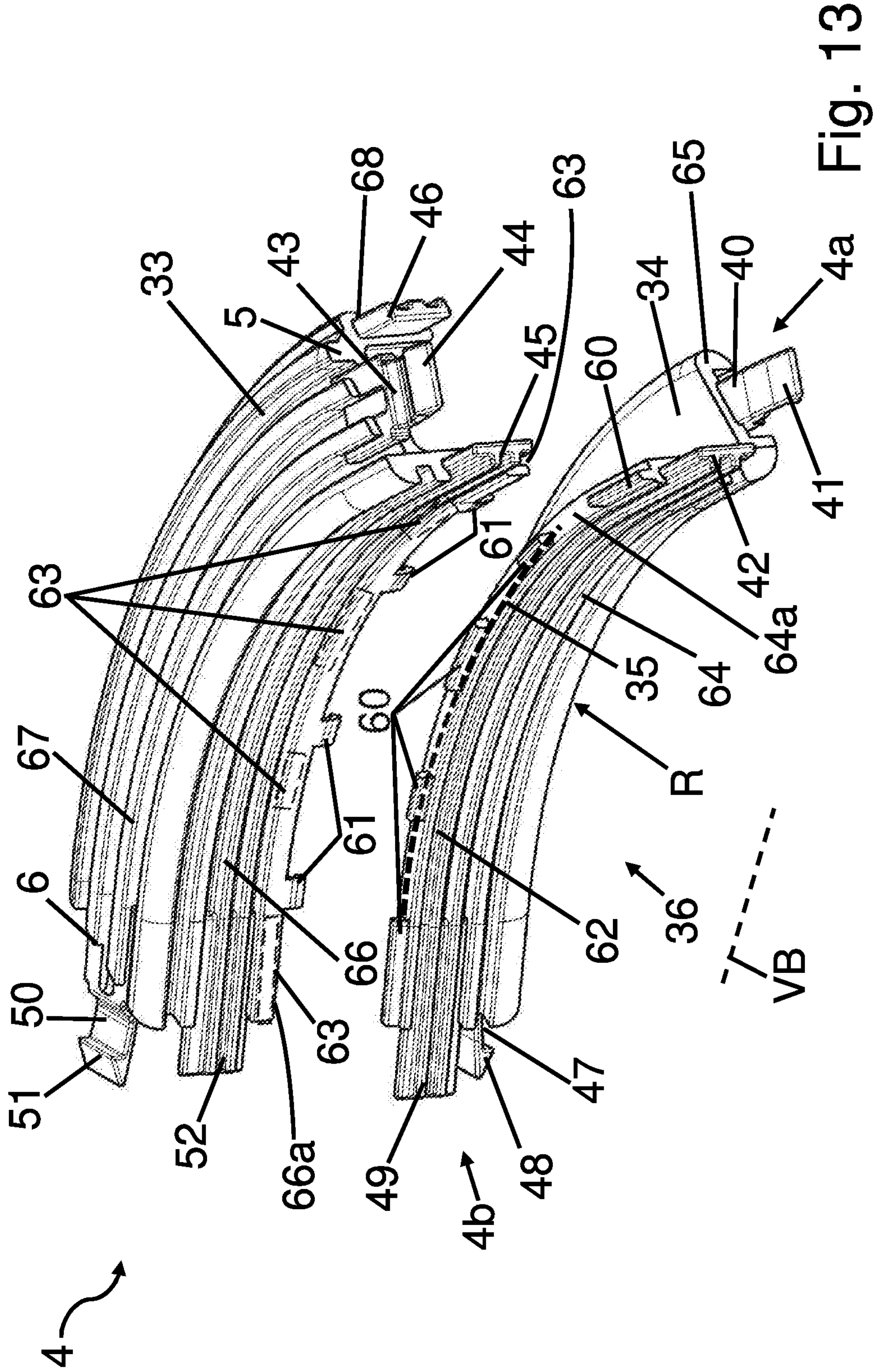
FIG. 13 shows a perspective rear view of the curved two-part connecting piece of the profile rail of FIG. 12.

FIGS. 12 and 13 show that the connecting piece 4 curved with a radius R comprises an upper connecting piece part 33 and a lower connecting piece part 34, wherein the upper connecting piece part 33 and the lower connecting piece part 34 can be plugged together in a force-fitting and form-fitting manner, by means of connecting-line plug-in elements 60 and by means of connecting-line latching elements 61, along a connecting line 35 to form a unit. The upper connecting piece part 33 and the lower connecting piece part 34 are thus separate components which, in a plugged-together state, form the connecting piece 4 according to FIGS. 11 and 14. Furthermore, the upper connecting piece part 33 and the lower connecting piece part 34 consist of the same plastic material.

FIG. 13 shows that the lower connecting piece part 34 has a total of five connecting-line plug-in elements 60 designed as rectangular protrusions, wherein the upper connecting piece part 33 has complementary cutouts 63, which are shown in dashed lines, into which the connecting-line plug-in elements 60 can be inserted in a force-fitting manner.

In this case, the lower connecting piece part 34 has an L-shaped cross section, wherein the L-shaped cross section comprises a first vertical leg 64 facing the vehicle body VB and a second horizontal leg 65 facing away from the vehicle body VB. The connecting-line plug-in elements 60 are arranged on a horizontal surface 64*a* of the first vertical leg 64 of the lower connecting piece part 34, wherein the connecting-line plug-in elements 60 extend in the longitudinal direction of the lower connecting piece part 34. Furthermore, the connecting-line plug-in elements 60 have different lengths so that the lower connecting piece part 34 has three long and two short connecting-line plug-in elements 60 which follow the curvature of the radius R.

The upper connecting piece part 33 has a U-shaped cross section rotated by 180°, wherein the U-shaped cross section comprises a first vertical leg 66 facing the vehicle body VB, a second horizontal leg 67 facing away from the vehicle body VB and a third vertical leg 68 protruding from the second leg 67. Here, cutouts 63 are arranged on a horizontal surface 66*a* of the first vertical leg 66 of the upper connecting piece part 33 and are respectively provided as a complementary receptacle for the connecting-line plug-in elements 60 of the lower connecting piece part 34.

Furthermore, four equally long vertical connecting-line latching elements 61 protrude from the horizontal surface 66*a* of the first vertical leg 66 of the upper connecting piece part 33, are arranged flush with a rear side of the first vertical leg 66 and are adapted to the curvature of the radius R.

Both the connecting-line plug-in elements 60 and the connecting-line latching elements 61 are arranged perpendicularly with respect to an extension direction of the upper connecting piece part 33 or of the lower connecting piece part 34, the latter facing one another.

In order to plug together the upper connecting piece part 33 with the lower connecting piece part 34, the connecting-line plug-in elements 60 of the lower connecting piece part 34 are arranged so as to be aligned with the cutouts 63 of the upper connecting piece part 33 and are plugged into one another. The different lengths of the connecting-line plug-in elements 60 or of the complementary cutouts 63 support the correct orientation and positioning of the upper connecting piece part 33 and of the lower connecting piece part 34 during assembly. In addition, the four connecting-line latching elements 61 designed as claws engage or latch behind, which are arranged on a side 36 of the lower connecting piece part 34 facing the vehicle body VB, an undercut 62 formed as a rib of the lower connecting piece part 34. The upper connecting piece part 33 and the lower connecting piece part 34 are thus connected to one another in a force-fitting and form-fitting manner, as a result of which a stable connecting piece 4 is provided.

Figure 14:
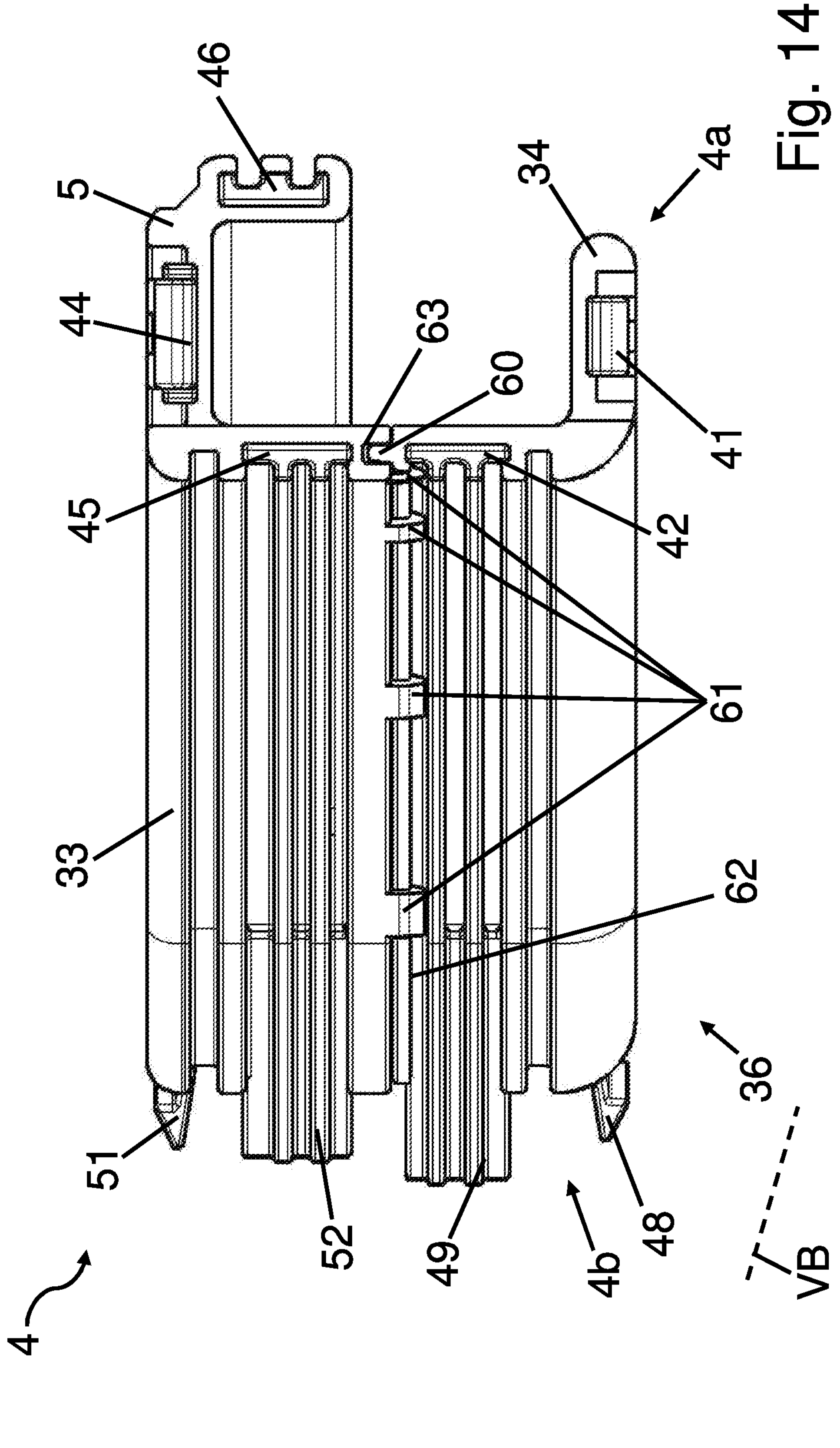
FIG. 14 shows an end-face front view of the connecting piece in a plugged-together state of FIG. 13.

FIG. 14 shows a front view of the assembled connecting piece 4. It can be clearly seen that the end-face connecting-line plug-in element 60 of the lower connecting piece part 34 is arranged in the end-face cutout 63 of the upper connecting piece part 33, wherein an outward directed side of the end-face cutout 63 is open. Moreover, it can be clearly seen in conjunction with FIG. 12 that the guide elements 42; 45; 49; 52 and the plug-in elements 46; 53 of the upper connecting piece part 33 and of the lower connecting piece part 34 are profiled. Furthermore, the latching lugs 41; 44; 48; 51 of the upper connecting piece part 33 and of the lower connecting piece part 34 have different widths, as a result of which the stability of the connecting piece 4 within the plugged-together profile rail 1 is increased with regard to any torsional forces.

Figure 8:
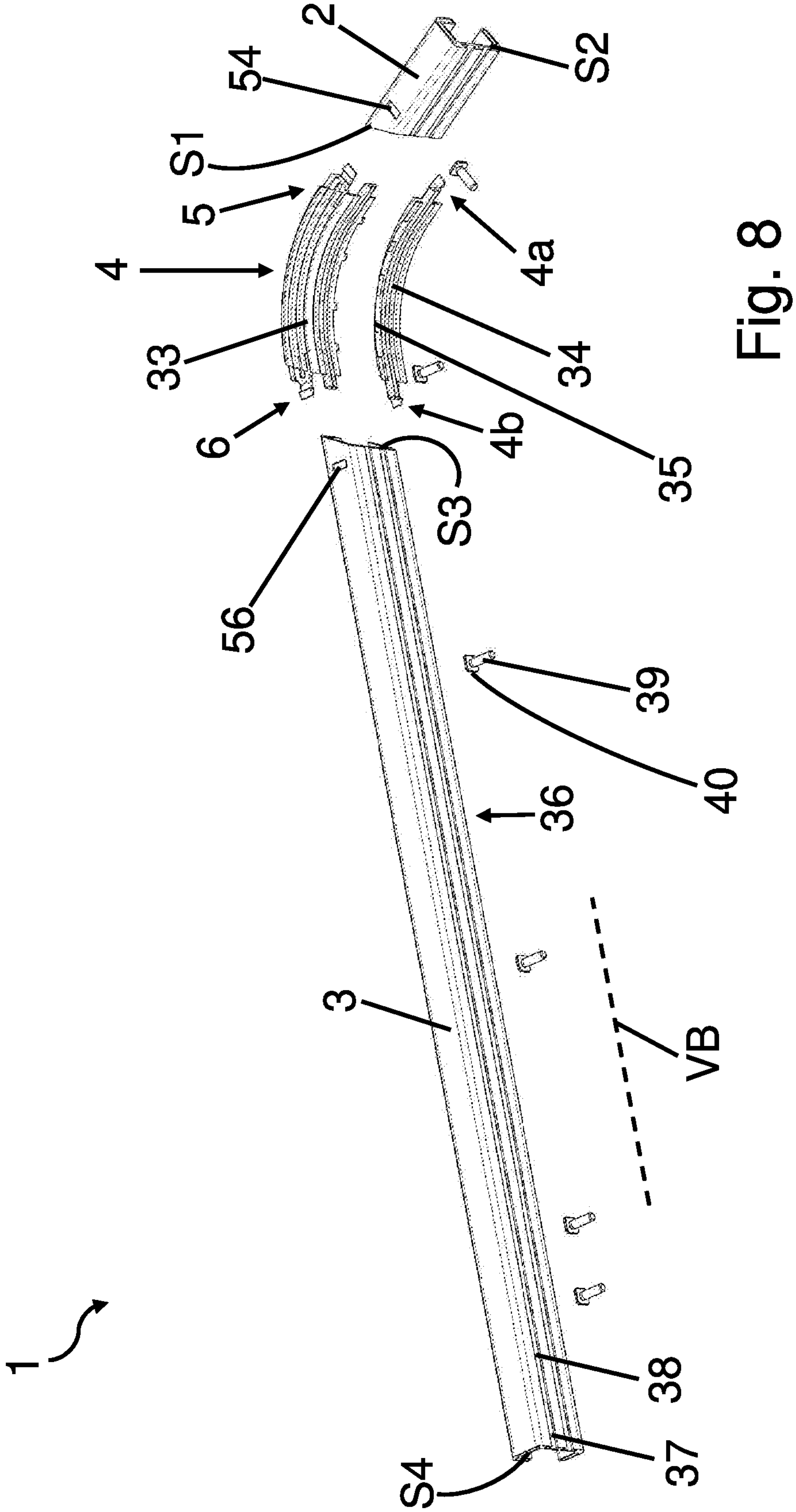
FIG. 8 shows a perspective rear view of the profile rail of FIG. 7.
Figure 9:
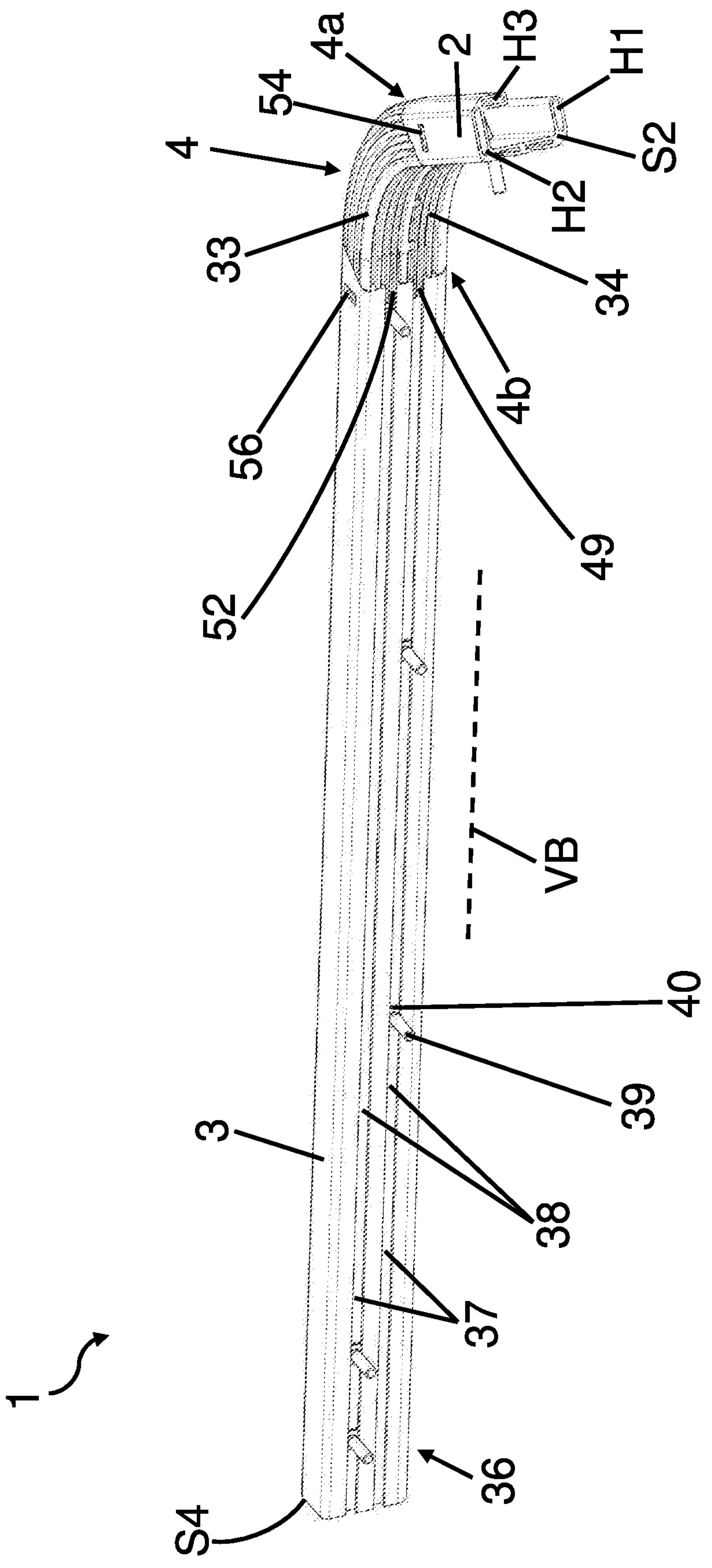
FIG. 9 shows a plugged-together profile rail of FIG. 8.

A further difference is that the first profile rail piece 2 and the second profile rail piece 3, on the side 36 facing the vehicle body VB of the vehicle, now have an upper and a lower hollow chamber 37, which are formed in the longitudinal direction and each have a slot recess 38, as shown in FIG. 8 and in FIG. 9, so that a head piece 40 of a threaded bolt 39 can be inserted into the hollow chamber 37 and can be displaced in the longitudinal direction of the first profile rail piece 2 or of the second profile rail piece 3. The threaded bolt 39 thus protrudes away from the profile rail 1 in the direction of the vehicle body VB, wherein the headpiece 40 of the threaded bolt 39 is displaceably arranged in the hollow chamber 37.

In this way, the flexibility of the profile rail 1 to be assembled with the vehicle is advantageously increased in that the position of the threaded bolt 39 can be adjusted in a guided manner in the longitudinal direction of the first profile rail piece 2 or of the second profile rail piece 3, whereby manufacturing tolerances can be easily compensated by a guided displacement of the threaded bolt 39 within the hollow chamber 37. Furthermore, fastening elements for fastening the profile rail 1 to the vehicle body VB are not visible to a person from the outside and a corrosion source is advantageously eliminated.

FIGS. 7 to 10 show that the first profile rail piece 2 has an upper counter latching element 54 designed as a rectangular through-hole and an opposite lower counter latching element 55 designed as a rectangular through-hole. The second profile rail piece 3 has an upper counter latching element 56 designed as a rectangular through-hole and an opposite lower counter latching element 57 designed as a rectangular through-hole. In this case, only the upper counter latching elements 54; 56 of the first profile rail piece 2 or of the second profile rail piece 3 can be seen in FIGS. 7 to 10.

Figure 10:
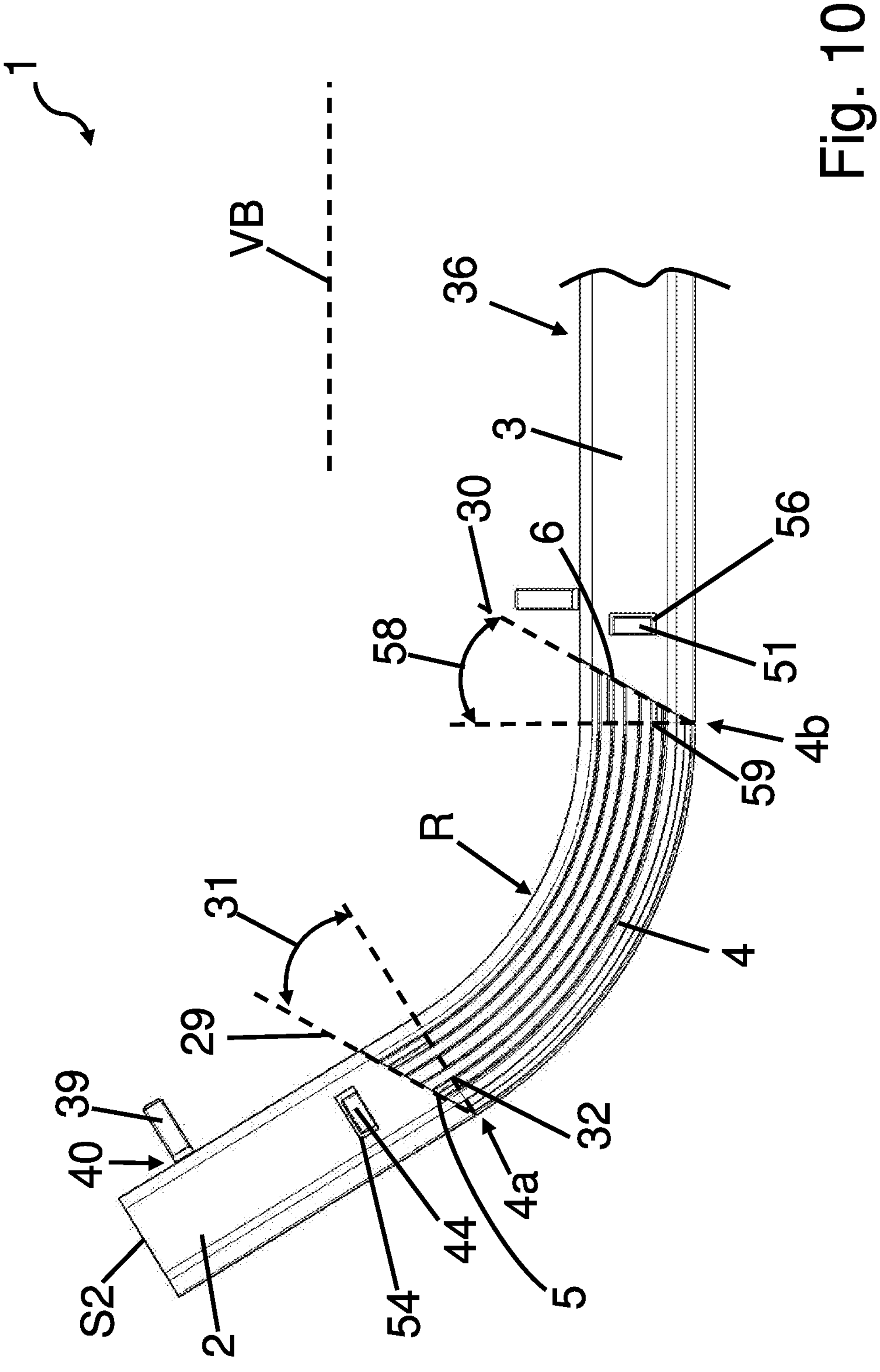
FIG. 10 shows a plan view of a transition region of the plugged-together profile rail of FIG. 9.

A further difference is that the first end-face connection region 5 of the connecting piece 4 is arranged in a first connection plane 29, which can be seen in FIG. 10 and in FIG. 11, wherein the first connection plane 29 extends at a first angle 31 to a first normal plane 32. Furthermore, the second opposite end-face connection region 6 of the connecting piece 4 is arranged in a second connection plane 30, wherein the second connection plane 30 extends at a second angle 58 to a second normal plane 59. Both the first normal plane 32 and the opposite second normal plane 59 are arranged perpendicularly to an extension direction of the connecting piece 4.

Moreover, the first end-face connection region 5 with the first connection plane 29 and the second end-face connection region 6 with the second connection plane 30 are arranged in parallel to one another, which can be seen in FIG. 10 in a view from above. Furthermore, both the first angle 31 and the second angle 58 are approximately 30°.

FIGS. 11 to 14 show that the first end-face connection region 5 of the upper connecting piece part 33 has an upper latching element 43 with a latching lug 44, an upper guide element 45 and a plug-in element 46, wherein the upper latching element 43 with the latching lug 44, the upper guide element 45 and the plug-in element 46 are arranged perpendicularly with respect to the first normal plane 32.

The opposite second end-face connection region 6 of the upper connecting piece part 33 has an upper latching element 50 with a latching lug 51, an upper guide element 52 and a plug-in element 53, wherein the upper latching element 50 with the latching lug 51, the upper guide element 52 and the plug-in element 53 are arranged perpendicularly with respect to the second normal plane 59.

Furthermore, the first end-face connection region 5 of the lower connecting piece part 34 has a lower latching element 40 with a latching lug 41 and a lower guide element 42, wherein the lower latching element 40 with the latching lug 41 and the lower guide element 42 are arranged perpendicularly with respect to the first normal plane 32.

The opposite second end-face connection region 6 of the lower connecting piece part 34 has a lower latching element 47 with a latching lug 48 and a lower guide element 49, wherein the lower latching element 47 with the latching lug 48 and the lower guide element 49 are arranged perpendicularly with respect to the second normal plane 59.

As a result, in an assembled state of the profile rail 1, the respective latching lugs 41; 44; 48; 51 of the connecting piece 4 are in engagement in the corresponding counter latching elements 54; 55; 56; 57 of the two profile rail pieces 2; 3, wherein the first profile rail piece 2 and the second profile rail piece 3 each have end faces S1; S2; S3; S4 which are complementary to the connecting piece 4 for a flush and virtually gap-free plugging-together of the profile rail 1.

Furthermore, FIG. 9 shows that, in an assembled state of the profile rail 1, the guide elements 49; 52 of the connecting piece 4 are respectively arranged at least in sections in a lower and upper hollow chamber 37 of the second profile rail piece 3. The opposite guide elements 42; 45, which are not visible here, are accordingly arranged in the lower or upper hollow chamber 37 of the first profile rail piece 2.

What is claimed is:

1. A profile rail for a door guide of a vehicle, comprising:

a first profile rail piece with a first end face and with a second end face; and a connecting piece, wherein the connecting piece comprises a first end and a second end, wherein the first end of the connecting piece comprises a first end-face connection region for connecting to the first profile rail piece, wherein the connecting piece is designed as a separate profile rail piece, wherein the connecting piece is connectable via the first end-face connection region to at least one of the end faces of the first profile rail piece by means of a plug-in system, and wherein the first end-face connection region is arranged in a first connection plane which has a first angle to a first plane normal to an extension direction of the connecting piece.

2. The profile rail according to claim 1, wherein the first angle between the first connection plane and the first normal plane extends between 20° and 70°.

3. The profile rail according to claim 1, wherein the first end-face connection region comprises protrusions formed as plug-in elements of the plug-in system and latching elements, and wherein the plug-in elements and the latching elements are arranged perpendicularly with respect to the first normal plane.

4. The profile rail according to claim 1, wherein the connecting piece comprises an upper connecting piece part and a lower connecting piece part, and wherein the upper connecting piece part and the lower connecting piece part is connectable to one another along a connecting line extending, at least in sections, transversely with respect to the first end-face connection region.

5. The profile rail according to claim 1, wherein the first profile rail piece comprises, on a side adapted to face the vehicle, a hollow chamber which is continuous at least in sections, wherein a slot recess is formed in the hollow chamber, and wherein a threaded bolt is insertable with a head piece into the hollow chamber.

6. The profile rail according to claim 1, wherein the connecting piece comprises at least one latching element with a resilient, elastic latching lug, and wherein the latching lug of the connecting piece is lockable and unlockable with a counter latching element formed as a recess in the first profile rail piece.

7. The profile rail according to claim 1, wherein the second end of the connecting piece comprises a second end-face connection region for connecting to a second profile rail piece, wherein the second end-face connection region is arranged in a second connection plane which has a second angle to a second plane normal to an extension direction of the connecting piece, and wherein the second connection plane extends at the second angle with respect to the second normal plane of the second end-face connection region of between 20° and 70°.

8. A profile rail for a door guide of a vehicle, comprising:

a first profile rail piece with a first end face and with a second end face; and a connecting piece, wherein the connecting piece comprises a first end and a second end, wherein the first end of the connecting piece comprises a first end-face connection region for connecting to the first profile rail piece, wherein the connecting piece is configured as a separate profile rail piece, wherein the connecting piece is connectable via the first end-face connection region to at least one of the end faces of the first profile rail piece by means of a plug-in system, wherein the first profile rail piece comprises, on a side adapted to face the vehicle, a hollow chamber which is continuous at least in sections, wherein a slot recess is formed in the hollow chamber, and wherein a threaded bolt is insertable with a head piece into the hollow chamber.

9. The profile rail according to claim 8, wherein the first end-face connection region is arranged in a first connection plane which has a first angle to a first plane normal to an extension direction of the connecting piece.

10. The profile rail according to claim 9, wherein the first end-face connection region comprises protrusions formed as plug-in elements of the plug-in system and latching elements, and wherein the plug-in elements and the latching elements are arranged perpendicularly with respect to the first normal plane.

11. The profile rail according to claim 9, wherein the first angle between the first connection plane and the first normal plane extends between 20° and 70°.

12. The profile rail according to claim 8, wherein the connecting piece comprises an upper connecting piece part and a lower connecting piece part, and wherein the upper connecting piece part and the lower connecting piece part are connectable to one another along a connecting line extending, at least in sections, transversely with respect to the first end-face connection region.

13. The profile rail according to claim 8, wherein the connecting piece comprises at least one latching element with a resilient, elastic latching lug, and wherein the latching lug of the connecting piece is lockable and unlockable with a counter latching element formed as a recess in the first profile rail piece.

14. The profile rail according to claim 8, wherein the second end of the connecting piece comprises a second end-face connection region for connecting to a second profile rail piece, wherein the second end-face connection region is arranged in a second connection plane which has a second angle to a second plane normal to an extension direction of the connecting piece, and wherein the second connection plane extends at the second angle with respect to the second normal plane of the second end-face connection region of between 20° and 70°.

15. A profile rail for a door guide of a vehicle, comprising:

a first profile rail piece with a first end face and with a second end face; and a connecting piece, wherein the connecting piece comprises a first end and a second end, wherein the first end of the connecting piece comprises a first end-face connection region for connecting to the first profile rail piece, wherein the connecting piece is configured as a separate profile rail piece, wherein the connecting piece is connectable via the first end-face connection region to at least one of the end faces of the first profile rail piece by a plug-in system, wherein the connecting piece comprises at least one latching element with a resilient, elastic latching lug, and wherein the latching lug of the connecting piece lockable and unlockable with a counter latching element formed as a recess in the first profile rail piece.

16. The profile rail according to claim 15, wherein the first profile rail piece comprises, on a side adapted to face the vehicle, a hollow chamber which is continuous at least in sections, wherein a slot recess is formed in the hollow chamber, and wherein a threaded bolt is insertable with a head piece into the hollow chamber.

17. The profile rail according to claim 15, wherein the first end-face connection region is arranged in a first connection plane which has a first angle to a first plane normal to an extension direction of the connecting piece.

18. The profile rail according to claim 17, wherein the first angle between the first connection plane and the first normal plane extends between 20° and 70°.

19. The profile rail according to claim 15, wherein the connecting piece comprises an upper connecting piece part and a lower connecting piece part, and wherein the upper connecting piece part and the lower connecting piece part are connectable to one another along a connecting line extending, at least in sections, transversely with respect to the first end-face connection region.

20. The profile rail according to claim 15, wherein the second end of the connecting piece comprises a second end-face connection region for connecting to a second profile rail piece, wherein the second end-face connection region is arranged in a second connection plane which has a second angle to a a second plane normal to an extension direction of the connecting piece, and wherein the second connection plane extends at the second angle with respect to the second normal plane of the second end-face connection region of between 20° and 70°.

* * * * *